US012227307B2

(12) United States Patent
Leitch et al.

(10) Patent No.: US 12,227,307 B2
(45) Date of Patent: Feb. 18, 2025

(54) PREDICTIVE MAINTENANCE MODEL DESIGN SYSTEM

(71) Applicant: The Boeing Company, Chicago, IL (US)

(72) Inventors: Robert Michael Leitch, Vancouver (CA); Yikan Wang, Burnaby (CA); Bingjing Yu, Richmond (CA)

(73) Assignee: The Boeing Company, Arlington, VA (US)

( * ) Notice: Subject to any disclaimer, the term of this patent is extended or adjusted under 35 U.S.C. 154(b) by 766 days.

(21) Appl. No.: 17/378,677

(22) Filed: Jul. 17, 2021

(65) Prior Publication Data

US 2022/0024607 A1  Jan. 27, 2022

Related U.S. Application Data

(60) Provisional application No. 63/055,289, filed on Jul. 22, 2020.

(51) Int. Cl.
*B64F 5/40* (2017.01)
*B64F 5/60* (2017.01)
(Continued)

(52) U.S. Cl.
CPC .................. *B64F 5/40* (2017.01); *B64F 5/60* (2017.01); *G05B 23/0216* (2013.01);
(Continued)

(58) Field of Classification Search
CPC .......... B64F 5/40; B64F 5/60; G05B 23/0216; G05B 23/0235; G05B 23/024;
(Continued)

(56) References Cited

U.S. PATENT DOCUMENTS

| 6,617,972 B2 | 9/2003 | Takarada et al. |
| 7,230,527 B2 | 6/2007 | Basu et al. |

(Continued)

FOREIGN PATENT DOCUMENTS

| WO | 0131579 A2 | 5/2001 |
| WO | 2021059302 A2 | 4/2021 |

OTHER PUBLICATIONS

Confusion Matrix, https://en.wikipedia.org/wiki/Confusion_matrix, Last edited Apr. 9, 2024 (Year: 2024).*

(Continued)

*Primary Examiner* — Hunter B Lonsberry
*Assistant Examiner* — Kyle Patrick Rufer
(74) *Attorney, Agent, or Firm* — Harrity & Harrity, LLP

(57) ABSTRACT

A data processing system for generating predictive maintenance models is disclosed, including one or more processors, a memory, and a plurality of instructions stored in the memory. The instructions are executable to receive a historical dataset relating to each of a plurality of systems, including maintenance data and operational data. The instructions are further executable to display one or more algorithm templates and one or more data features calculated from the operational data, in a graphical user interface. The instructions are further executable to receive a selection of an algorithm template, a data feature, and a value of a parameter associated with the algorithm template, and to train and evaluate the selected algorithm template on the selected data feature according to the received value. The instructions are further executable to display a result of a metric of the evaluation, and generate a predictive maintenance model using the selected algorithm template.

20 Claims, 15 Drawing Sheets

(51) Int. Cl.
*G05B 23/02* (2006.01)
*G06N 5/04* (2023.01)
*G06N 20/00* (2019.01)
*G06Q 10/20* (2023.01)

(52) U.S. Cl.
CPC ....... *G05B 23/0235* (2013.01); *G05B 23/024* (2013.01); *G05B 23/0281* (2013.01); *G05B 23/0283* (2013.01); *G06N 5/04* (2013.01); *G06N 20/00* (2019.01); *G06Q 10/20* (2013.01)

(58) Field of Classification Search
CPC .. G05B 23/0281; G05B 23/0283; G06N 5/04; G06N 20/00; G06Q 10/20
See application file for complete search history.

(56) References Cited

U.S. PATENT DOCUMENTS

| | | | |
|---|---|---|---|
| 7,349,825 | B1 | 3/2008 | Williams et al. |
| 7,621,193 | B2 | 11/2009 | Fay et al. |
| 8,040,243 | B2 | 10/2011 | Bommer et al. |
| 8,054,092 | B2 | 11/2011 | Fay et al. |
| 8,138,773 | B2 | 3/2012 | Fay et al. |
| 8,237,548 | B2 | 8/2012 | Fay et al. |
| 8,620,714 | B2 | 12/2013 | Williams et al. |
| 8,779,729 | B2 | 7/2014 | Shiraishi |
| 9,002,722 | B2 | 4/2015 | Helms et al. |
| 9,002,775 | B1* | 4/2015 | Harrison ............... G06N 20/00 706/52 |
| 9,619,881 | B2 | 4/2017 | Maddah et al. |
| 9,633,171 | B2 | 4/2017 | McNair |
| 9,655,564 | B2 | 5/2017 | Sternickel et al. |
| 9,659,087 | B2 | 5/2017 | Cazzanti et al. |
| 10,062,053 | B1 | 8/2018 | Oakley et al. |
| 10,268,948 | B2 | 4/2019 | Warn et al. |
| 10,317,870 | B1 | 6/2019 | Burnett et al. |
| 10,401,319 | B2 | 9/2019 | Mitchell et al. |
| 10,776,760 | B2 | 9/2020 | Ethington et al. |
| 10,963,491 | B2 | 3/2021 | Weinstein et al. |
| 11,410,056 | B1 | 8/2022 | Xu et al. |
| 2006/0144997 | A1* | 7/2006 | Schmidt ............... G07C 5/0808 340/960 |
| 2007/0114422 | A1 | 5/2007 | Berkcan et al. |
| 2008/0215513 | A1 | 9/2008 | Weston et al. |
| 2012/0098518 | A1 | 4/2012 | Unagami et al. |
| 2014/0278713 | A1 | 9/2014 | Zivelin et al. |
| 2016/0178714 | A1 | 6/2016 | Fautz |
| 2016/0358099 | A1 | 12/2016 | Sturlaugson et al. |
| 2017/0097860 | A1 | 4/2017 | Pang |
| 2017/0166328 | A1* | 6/2017 | Ethington ............... G06Q 10/20 |
| 2017/0193372 | A1 | 7/2017 | Schimert |
| 2017/0308802 | A1* | 10/2017 | Ramsøy ................. G06N 20/00 |
| 2017/0319097 | A1 | 11/2017 | Amthor et al. |
| 2017/0364831 | A1 | 12/2017 | Ghosh et al. |
| 2018/0024214 | A1 | 1/2018 | Bhat et al. |
| 2018/0202959 | A1 | 7/2018 | Mitchell et al. |
| 2019/0048740 | A1* | 2/2019 | Agarwal ............... G06F 16/285 |
| 2019/0092495 | A1 | 3/2019 | Lu et al. |
| 2019/0156298 | A1 | 5/2019 | Ethington et al. |
| 2019/0187685 | A1 | 6/2019 | Cella et al. |
| 2019/0303496 | A1 | 10/2019 | Weinstein et al. |
| 2020/0134369 | A1 | 4/2020 | Chopra et al. |
| 2020/0225655 | A1 | 7/2020 | Cella et al. |
| 2020/0250905 | A1 | 8/2020 | Sundareswara et al. |
| 2020/0293940 | A1 | 9/2020 | Chopra et al. |
| 2020/0331636 | A1 | 10/2020 | Mulholland et al. |
| 2020/0379454 | A1 | 12/2020 | Trinh et al. |
| 2020/0410459 | A1 | 12/2020 | Ethington et al. |
| 2021/0004284 | A1 | 1/2021 | Vah et al. |
| 2021/0277906 | A1 | 9/2021 | Megchiani et al. |
| 2022/0051198 | A1 | 2/2022 | Thakkar et al. |

OTHER PUBLICATIONS

Delua, Julianna, "Supervised vs. Unsupervised Learning: What's the Difference?", Mar. 12, 2021, IBM Blog, 7 pgs.
U.S. Patent and Trademark Office, Non-Final Office Action regarding U.S. Appl. No. 17/020,560, dated Aug. 25, 2023, 9 pages.
U.S. Patent and Trademark Office, Final Office Action regarding U.S. Appl. No. 17/378,674, dated Aug. 31, 2023, 28 pages.
U.S. Patent and Trademark Office, Non-Final Office Action regarding U.S. Appl. No. 17/378,676, dated Sep. 8, 2022, 38 pages.
U.S. Patent and Trademark Office, Non-Final Office Action regarding U.S. Appl. No. 17/020,560, dated Sep. 22, 2022, 14 pages.
Mofokeng et al., Analysis of aircraft maintenance processes and cost, 2020, Elsevier, B.V., 27th CIRP Life Cycle Engineering (LCE) Conference, CIRP 90, pp. 467-472.
U.S. Patent and Trademark Office, Non-Final Office Action regarding U.S. Appl. No. 17/378,674, dated Mar. 9, 2023, 41 pages.
U.S. Patent and Trademark Office, Final Office Action regarding U.S. Appl. No. 17/378,676, dated Apr. 28, 2023, 39 pages.
U.S. Patent and Trademark Office, Final Office Action regarding U.S. Appl. No. 17/020,560, dated Jan. 31, 2023, 13 pages.

* cited by examiner

Select Aircraft Model:
[× B748]

Select Event Type:
[× removal_unplanned]

Select Event Position:
[× leftouter]

Select Event Category:
[× TRANSMITTER RVDT T/E FLAPS]

568

Experiment Results

Search:

| Evaluation | Count |
|---|---|
| Accuracy | 40.00% |
| Precision | 100.00% |
| Recall | 25.00% |
| Median Time from Detection to Removals | 2.00 days |
| TP | 1 |
| FP | 0 |
| FN | 3 |
| suspect | 0 |

PREDICTIVE MAINTENANCE MODEL DESIGN SYSTEM

CROSS-REFERENCES

This application claims the benefit under 35 U.S.C. § 119(e) of the priority of U.S. Provisional Patent Application Ser. No. 63/055,289, filed Jul. 22, 2020, the entirety of which is hereby incorporated by reference for all purposes.

BACKGROUND

Data are routinely collected by engineers on both maintenance and operation of equipment such as the aircraft of an airline's fleet, and can offer valuable insights into future performance and potential repair needs. However, the complexity and sheer quantity of the collected data renders much useful analysis beyond the skills of a typical safety or maintenance engineer. Even for trained engineering analysts with the requisite specialist skills the process can be time consuming and laborious using typical software tools such as Excel or Tableau.

Machine learning is an increasingly popular tool for utilizing and interpreting such large datasets, but may be out of reach for a typical safety or maintenance engineer. Effective application of machine learning techniques to a maintenance problem typically requires identification of a relevant data pattern or pre-cursor signature, as well as expertise in data science to select and tune an appropriate algorithm, and programming skills to implement training and evaluation of the algorithm to generate a predictive model.

Software tools to assist in the data analysis and model design process are desirable, to bring the power and insights of trend analysis and predictive models to a broader range of users, and simplify and accelerate the process for experienced analysts and data scientists.

SUMMARY

The present disclosure provides systems, apparatus, and methods relating to predictive maintenance model design. In some examples, a data processing system for generating predictive maintenance models may include one or more processors, a memory including one or more digital storage devices, and a plurality of instructions stored in the memory. The instructions may be executable by the one or more processors to receive a historical dataset relating to each system of a plurality of systems, the historical dataset including maintenance data and operational data. The instructions may be further executable to display one or more algorithm templates and one or more data features calculated from the operational data, in a graphical user interface. The instructions may be further executable to receive a selection of an algorithm template, a data feature, and a first value of a hyperparameter associated with the algorithm template, and to train and evaluate the selected algorithm template on the selected data feature according to the first value of the hyperparameter. The instructions may be further executable to display a first result of a metric of the evaluation in the graphical user interface, and generate a predictive maintenance model using the selected algorithm template.

In some examples, a computer implemented method of generating a predictive maintenance model may include receiving a historical dataset relating to each system of a plurality of systems, the historical dataset including maintenance data and operational data. The method may further include displaying one or more algorithm templates and one or more data features calculated from the operational data, in a graphical user interface. The method may further include receiving a selection of an algorithm template, a data feature, and a first value of a hyperparameter associated with the algorithm template, and training and evaluating the selected algorithm template on the selected data feature according to the first value of the hyperparameter. The method may further include displaying a first result of a metric of the evaluation in the graphical user interface, and generating a predictive maintenance model using the selected algorithm template.

In some examples, a computer program product for generating predictive maintenance models may include a non-transitory computer-readable storage medium having computer-readable program code embodied in the storage medium, the computer-readable program code configured to cause a data processing system to generate a predictive maintenance model. The code may include at least one instruction to receive a historical dataset relating to each system of a plurality of systems, the historical dataset including maintenance data and operational data. The code may further include at least one instruction to display one or more algorithm templates and one or more data features calculated from the operational data, in a graphical user interface. The code may further include at least one instruction to receive a selection of an algorithm template, a data feature, and a first value of a hyperparameter associated with the algorithm template, and to train and evaluate the selected algorithm template on the selected data feature according to the first value of the hyperparameter. The code may further include at least one instruction to display a first result of a metric of the evaluation in the graphical user interface, and generate a predictive maintenance model using the selected algorithm template.

Features, functions, and advantages may be achieved independently in various examples of the present disclosure, or may be combined in yet other examples, further details of which can be seen with reference to the following description and drawings.

BRIEF DESCRIPTION OF THE DRAWINGS

FIG. 12 is a diagram of a confusion matrix result pane of the GUI of FIG. 5.

FIG. 14 is a diagram of a trial comparison pane of the GUI of FIG. 5.

FIG. 15 is an illustrative heat map of the GUI of FIG. 5.

DETAILED DESCRIPTION

Various aspects and examples of a predictive maintenance model design system including an algorithm training and evaluation module, as well as related systems and methods, are described below and illustrated in the associated drawings. Unless otherwise specified, a design system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

Figure 1:
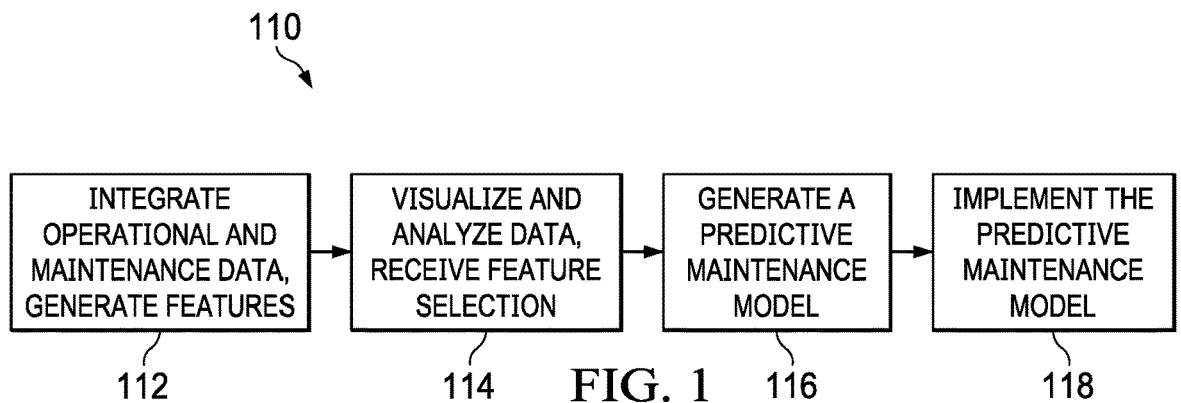
FIG. 1 is a flow chart depicting steps of an illustrative predictive maintenance model design process in accordance with aspects of the present disclosure.

In general, a predictive maintenance model design system may be configured to assist a user in discovering and interpreting data trends and patterns, designing and training a prediction algorithm, and/or implementing a generated predictive maintenance model. For example, the design system may be a data processing system and/or a software program configured to execute a process 110, as shown in FIG. 1, to generate a machine learning model for predicting maintenance requirements of a system based on historical maintenance and operational data of a plurality of systems by detecting predictive anomalies in ongoing operational data.

At step 112 process 110 includes integrating operational and maintenance data, and generating data features. The integration may include receiving at least two distinct datasets for a plurality of systems such as a fleet of aircraft, and combining the data to form a single historical dataset. The datasets may be stored in the memory of the processing system on which process 110 is executed, may be available on a server for access over a network of some kind, or may be received by any effective means. In some examples, data may be drawn from multiple databases and/or from disparate sources.

Integrating the data may also include pre-processing or modification to prepare the data for use. The dataset may include numerical values organized as attributes of a plurality of maintenance and/or repair records and a plurality of telemetry and/or sensor records for each of a plurality of systems (e.g., aircraft). Raw attribute data from the telemetry records may be processed to generate one or more operational data features. The data features may be an unaltered attribute, may be a statistical function of an attribute, and/or may be an aggregate of multiple attributes or records.

At step 114, process 110 includes visualizing and analyzing the historical dataset, and receiving a selection of operational data features. The visualization may include displaying a variety of graphs, charts, plots, and tables in a graphical user interface (GUI) along with a plurality of interactive elements. Raw maintenance and operational data from the historical dataset, generated data features, and/or results of analysis of the dataset may be visualized. A user such as an engineering analyst may use the visualizations to identify trends in the sensor data that are indicative of equipment degradation and failure. Facilitating rapid identification of signs of deviation from normal operation by such an analysis is desirable in order to allow efficient generation of useful predictive models.

The interactive elements of the GUI may be configured to allow input of constraints on what data is visualized, initiation of desired analysis, and selection of operational data features. For example, the GUI may include selection boxes or buttons, display of contextual information on cursor hover, drill-down from graphs to tables or from complete dataset to data subsets, a refresh trigger, a mathematical function input, and/or any GUI elements known to those skilled in the art of software design.

At step 116, process 110 includes generating a predictive maintenance model based on the selected operational data features. Model generation may include selection of an appropriate anomaly detection algorithm, and input of algorithm parameters. In some examples, one or more algorithm templates may be presented in the GUI. In some examples, a plurality of logic block elements may be placeable in an interactive workflow building environment to define an appropriate algorithm and parameters.

Generating the predictive maintenance model may further include training and testing the selected algorithm. The algorithm may be trained and evaluated one or more times, and detailed test results displayed in the GUI. A selection of an algorithm configuration exhibiting desired properties may be received. The selected algorithm configuration may then be used to train a final model on the full historical dataset.

At step 118, the process includes implementing the generated predictive maintenance model. In some examples, the generated model may be prepared for deployment by software and/or a data processing system separate from the predictive maintenance model design system used to execute process 110. In such examples, the generated model may be prepared for deployment as part of a software program, or may be converted to an accessible format, e.g., including an application programming interface (API).

In some examples, implementing the generated predictive maintenance model may include receiving additional operational data. For instance, additional flight data may be recorded by an aircraft fleet and input to the predictive maintenance model design system running process 110. The predictive maintenance model may be applied to the additional operational data, and generate alerts for detected anomalies. Based on the generated alerts, proactive and preventative maintenance action such as inspection, testing, repair, or replacement of equipment, may be taken by maintenance workers to avoid potential costly and disruptive unplanned component replacements or other undesirable maintenance events.

Process 110 may be repeated to generate additional predictive maintenance models. For example, a suite of predictive maintenance models may be generated for an aircraft fleet. Over time, additional models may be generated or re-generated based on new data and/or to address new maintenance challenges.

Aspects of a predictive maintenance model design system or design process such as process 110 may be embodied as a computer implemented method, computer system, or computer program product. Accordingly, aspects of a predictive maintenance model design system may take the form of an entirely hardware example, an entirely software example (including firmware, resident software, micro-code, and the like), or an example combining software and hardware aspects, all of which may generally be referred to herein as a "circuit," "module," or "system." Furthermore, aspects of the predictive maintenance model design system may take the form of a computer program product embodied in a computer-readable medium (or media) having computer-readable program code/instructions embodied thereon. The computer-readable program code may be configured to cause a data processing system to generate a predictive maintenance model.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a cloud-based storage service, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of a predictive maintenance model design process may be written in one or any combination of programming languages, including an object-oriented programming language such as Java, Smalltalk, C++, Python, and/or the like, and conventional procedural programming languages, such as C. Mobile apps may be developed using any suitable language, including those previously mentioned, as well as Objective-C, Swift, C#, HTML5, and the like.

The program code may execute entirely on a user's computer, partly on the user's computer, as a stand-alone software package, partly on the user's computer and partly on a remote computer, or entirely on the remote computer or server. In the latter scenario, the remote computer or server may be connected to the user's computer through any type of network, including a local area network (LAN) or a wide area network (WAN), and/or the connection may be made to an external computer (for example, through the Internet using an Internet Service Provider). The remote computer or server may be part of a cloud-based network architecture, such as a cloud computing service or platform. In some examples, the program code may be executed in a software-as-a-service (SaaS) framework accessed by a file transfer protocol such as secure shell file transfer protocol (SFTP) and/or an internet browser on the user's computer.

Aspects of the predictive maintenance design system are described below with reference to flowchart illustrations and/or block diagrams of methods, apparatus, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the predictive maintenance design system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of exemplary predictive maintenance model design systems and algorithm training and evaluation modules as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Predictive Maintenance Model Design System

Figure 2:
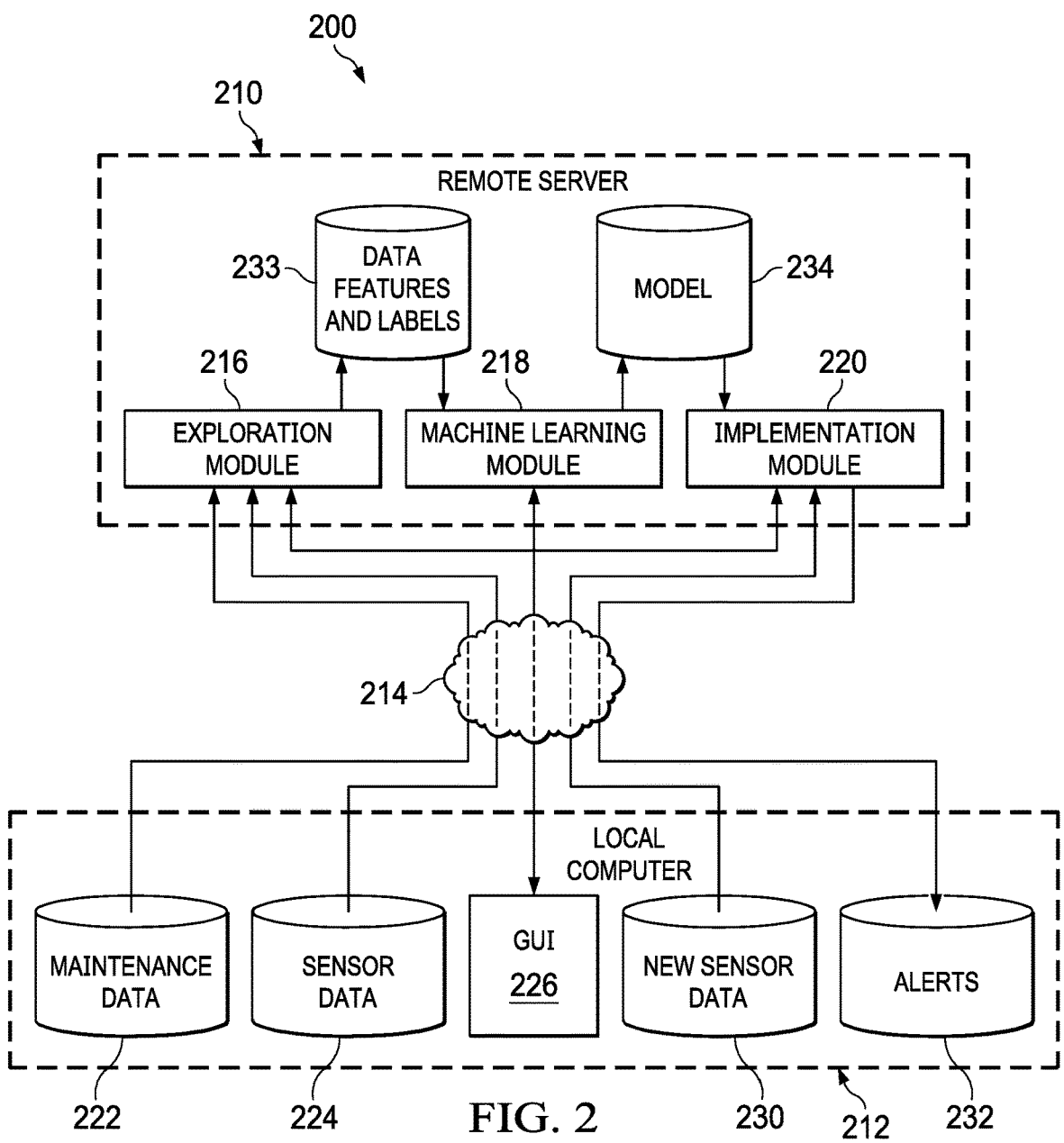
FIG. 2 is a schematic diagram of an illustrative predictive maintenance model design system.
Figure 3:
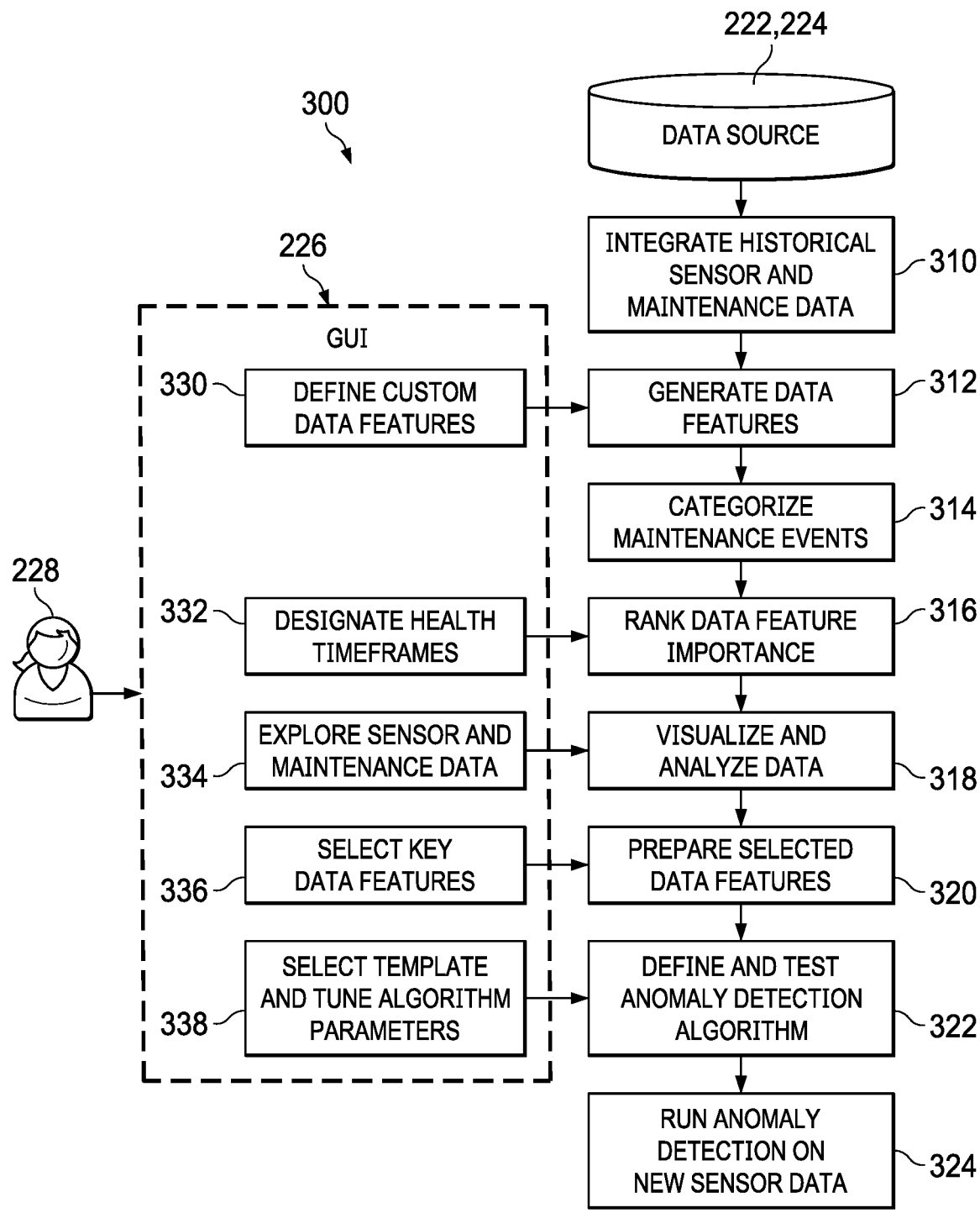
FIG. 3 is a flow chart depicting steps of another illustrative predictive maintenance model design process in accordance with aspects of the present disclosure.

As shown in FIGS. 2 and 3, this section describes an illustrative system 200, configured to execute a design and implementation process 300. System 200 is an example of a predictive maintenance model design system, as described above. Design and implementation process 300 is an example of process 110, also as described above.

System 200 is configured to assist a user in completing process 300 to generate and implement machine learning models to detect anomalies in operational data which are indicative of future maintenance events. In the present example, system 200 is designed to generate models for a fleet of aircraft, based on recorded flight data. In some examples, system 200 may additionally or alternatively be used for predictive maintenance with respect to other mechanical systems, such as ground vehicles, ships, manufacturing equipment, industrial appliances, etc.

System 200 may be used to prepare models relating to different aspects (e.g., components or systems) of aircraft, and one set of historical data may be used to prepare multiple different models. For example, system 200 may be used to prepare a model for each of multiple subsystems present in an aircraft, to prepare a model for each class of sensor recording flight data, or to prepare a model for each failure mode of a particular component.

FIG. 2 is a schematic diagram depicting a remote server 210 and a local computer 212 on which design system 200 is executed. The server and/or computer may be an example of data processing system 600 as described in Example C, below. The server and local computer communicate, or exchange information, over a network 214 such as the internet. Multiple modules of system 200 are run on remote server 210. The modules may comprise, for example, instructions and/or data stored in a memory and executed by a processor. The modules, which may also be referred to as programs or processes, include an exploration module 216, a machine learning module 218, and an implementation module 220.

Modules 216, 218, 220 may be described as performing steps 310-324 of process 300, in cooperation with a user 228 who performs steps 330-338 of the process, as depicted in FIG. 3. Process 300 may also be described entirely as steps performed by modules 216, 218, 220 including receiving inputs from user 228 as described in steps 330-338.

User 228 interacts with the modules of system 200 on remote server 210 through a graphical user interface (GUI) 226 on local computer 212. The user is guided through a data exploration and model design process by the GUI, then a generated model is implemented by remote server 210 on new operational data to return anomaly alerts. New operational data may be input and alerts returned on an ongoing basis.

In the present example, GUI 226 is executed by local computer 212. For instance, the user may access the GUI through an internet browser installed on the local computer, or system 200 may include a client-side program running on the local computer and displaying the GUI. In general, a user may interface with system 200 in any manner allowing effective display and input of information.

System 200 may be configured to facilitate exploration of multiple maintenance events of interest, investigation of multiple trends concurrently, design of multiple algorithms, and/or use by multiple users of local computer 212 through, for example, creation of multiple distinct sessions. Process 300 may be performed or repeated independently in each such session, and/or information such as data features, analysis results, or algorithm configurations may be accessible and/or selectively shared between sessions.

Exploration module 216 receives historical data from a maintenance data source 222 and a sensor or operational data source 224. In some examples, the module may receive historical data from a plurality of maintenance and/or operational data sources. Typically, flight data are recorded by airplane sensors and downloaded in large data sets post flight. In some examples, sensor data may additionally or alternatively be downloaded during a flight using a system such as Aircraft Communications Addressing and Reporting System (ACARS). Separately, airline maintenance teams maintain information logs, recording maintenance events, defects, and actions taken, using maintenance information systems in an airline back-office. These two information sources, flight data and maintenance data, are not integrated. However, in order to perform predictive maintenance analyses, flight data patterns over time may need to be compared with the occurrence of maintenance events.

To address this, exploration module 216 may integrate the datasets for analysis and visualization. Step 310 of process 300 includes integrating the historical maintenance and sensor data. The data may be integrated into a single historical dataset and prepared for display and analysis. For example, the data may be received from other software and may be converted from an output format of such software to a format appropriate to modules 216, 218 and 220. Preprocessing algorithms may be applied to the dataset to discretize continuous variables, reduce dimensionality, separate measurements into components, eliminate missing or inaccurate data, and/or any appropriate modifications. When the dataset includes data from multiple sources, pre-processing may include merging data, harmonizing formatting, and matching organizational structure.

Exploration module 216 is configured to integrate data saved locally to computer 212 (e.g., repair logs saved as spreadsheets and/or in a repair management software database). In some examples, the exploration module may also be configured to interface or communicate with external databases or database software to retrieve relevant data. For example, the exploration module may generate SQL queries to request data from an online database. Such connectivity may facilitate access to complete and up-to-date information. The module may also be configured to accept input of data in any anticipated format.

At step 312, exploration module 216 generates data features from the operational data of the historical dataset, including phase-dependent aggregate data features. Trending of recorded sensor data can be difficult due to large variations in sensor values that occur as a result of equipment operational cycles. For example, if an analyst simply aggregates the time series recordings for many aircraft flights into one large time series, and plots this data over long periods to look for a trend over time, the result is typically a very noisy distribution with no significant trends evident.

Digitally recorded sensor data, e.g. temperatures, pressures, electrical currents, and actuator positions, from an electro-mechanical system such as an aircraft or other vehicle, may be discrete samples in a time series covering a period of observation. For aircraft, these data are recorded for each flight. Typical sampling rates are 0.25 Hz to 8 Hz for modern commercial aircraft. The recorded values of these data vary substantially over the course of an operational cycle, e.g. during the flight of an aircraft. For example, recorded temperatures could vary by hundreds of degrees depending on variables such as altitude (e.g. ground level versus cruising altitude), operational mode of the equipment, and any dynamic operational control changes applied to the equipment, either automatically or via an explicit operator, e.g. pilot.

Exploration module 216 avoids this obfuscation by dividing the data according to a plurality of phases of the operational cycle before aggregation. For example, sensor data from an aircraft flight may be divided into phases of taxi-out, take-off, climb, cruise, descent, landing, and taxi-in. A range of aggregating functions may then be separately applied to the data associated with each phase, to create phase-dependent aggregate features that can be trended over long periods, e.g. thousands of flights. For instance, the data features may combine phase-dependence and a value constraint or a differential comparison with aggregating statistical functions.

In some examples the module may generate a pre-defined set of data features corresponding to a maintenance event of interest selected by the user. Such a set may include raw attribute data features and/or aggregate data features. For example, if the user selects an overheating event the generated data features may include a temperature sensor reading, an average temperature sensor reading during take-off, a difference in temperature reading between port and starboard sensors, and/or an average difference in temperature reading between port and starboard sensors during take-off.

At step 330, user 228 may define custom data features. In other words, exploration module 216 may receive a mathematical function or other logical ruleset defining a custom data feature from user 228, and generate a data feature accordingly. A GUI 226 of design system 200 may include an interface facilitating input of one or more such rulesets. Custom data features may include representations of recorded time-series sensor data that capture events, transitions, performance metrics, and states of the system under observation. Any custom defined data features may be ranked, visualized, and communicated to machine learning module 218 in the same manner as other data features generated at step 312, such as the pre-defined set of data features.

Exploration module 216 is further configured to categorize maintenance events, at step 314 of process 300. More specifically, the module may divide maintenance events of a selected type into two or more sub-categories based on machine learning analysis of the maintenance data. For example, topic modelling may be applied to text of maintenance logs to divide unplanned replacements of a selected component into a plurality of failure types. The maintenance events, sub-categories, and/or other results of the machine learning analysis may be displayed to user 228 through GUI 226.

At step 332, user 228 may designate health timeframes relative to recorded maintenance events. That is, exploration module 216 may receive one or more time thresholds from the user. For example, user 228 may indicate that components having undergone replacement are healthy for a first time period following replacement, and degraded for a second time period preceding replacement. The exploration module may subdivide operational data into labeled classes or categorizes based on this received designation. In some examples, exploration module 216 may automatically use maintenance event sequences to label the sensor data for the purposes of supervised machine learning, such as classification models for failure prediction.

At step 316, exploration module 216 ranks the importance of some or all of the data features generated in step 312. Importance may be ranked according to one or more quantitative measures of influence of a given data feature on predictive model performance. The ranking may indicate relative importance of the data features in predicting occurrence of a set of historical maintenance events.

The exploration module may use the designations from step 332 in a machine learning method to perform the ranking. In some examples, the user may select one or more data features and one or more maintenance events to be used in the ranking process. The machine learning method may evaluate correlation between data features and maintenance events in an absolute and/or relative sense. For example, the module may iterate supervised classification, eliminating a data feature at each iteration to generate a relative ranking of feature importance.

At step 334, user 228 may use GUI 226 to explore the sensor and maintenance data integrated at step 310. The user may also explore the data features generated at step 312, maintenance event categories generated at step 314, and/or data feature rankings generated at step 316. The user may explore the data in order to identify potential data patterns, pre-cursor signatures, and/or candidate data features useful for creating a predictive maintenance model.

At step 318, Exploration module 216 may visualize and analyze data to aid the user's data exploration. The exploration module is configured to visualize and display both the operational and maintenance data of the historical dataset in a manner that enables a user to discover behavior patterns in large sets of recorded flight sensor data. Flight sensor data and maintenance event data may be displayed overlaid together in one or more graphs and/or charts to allow the user to identify relevant correlations and trends over time. In other words, the exploration module automatically combines the flight data features and maintenance events into a single time series visualization, enabling visual identification of important flight data patterns that are associated with maintenance problems.

As described above with reference to step 312, trending raw sensor data may provide limited insight. Instead, exploration module 216 may display the generated phase-dependent aggregate data features. The health timeframes designated at step 332 may also be displayed relative to each maintenance event. Visualizations may be displayed to the user, and constraints, selections, and other inputs received from the user through GUI 226.

Exploration module 216 may perform automatic analysis of the historical dataset as well as additional analysis as selected by the user. Automatic analysis may include standard statistical measures, detection of potential seasonal bias, and/or any analysis typically relevant to maintenance prediction. In some examples, the analysis automatically performed may depend on the maintenance event of interest selected by the user.

GUI 226 may also provide user 228 control over iteration of steps 312-316, 330, and 332. For example, user 228 may identify a data trend of interest when exploring sensor and maintenance data in step 334 and perform step 330 again to define a related custom data feature, or may begin with step 318 to have the exploration module visualize and analyze data relevant to a data trend of interest before performing step 330 to define a related custom feature. The user may then trigger generation of the defined feature in step 312, and re-ranking of data feature importance in step 316.

At step 336, user 228 may select one or more key data features. That is, exploration module 216 may receive a selection of one or more data features. In some examples, the user may opt for the exploration module to perform an automatic selection of one or more data features. At step 320, the exploration module prepares the selected data features and any relevant related information, as appropriate. Exploration module 216 communicates a set of the data features and labels 233 to machine learning module 218.

Machine learning module 218 is configured to assist user 228 in defining, training, and evaluating candidate algorithms to arrive at a trained anomaly detection model having desired performance traits. The machine learning module may be configured to accommodate users of different levels of expertise and/or allow a user to select a desired level of guidance for a particular project. For example, GUI 226 may include first and second interfaces to the machine learning module.

The first and second interfaces may be designed for beginner and advanced users, or for simplified and complex design, respectively. A user may select the first interface due to limited experience, and/or in order to save time and avoid potential complications such as over-fitting. A user may select the second interface to build and test an algorithm from scratch and/or to create custom algorithm characteristics. In some examples, a user may start with a simple algorithm generated in the first interface, and introduce targeted complexity using tools in the second interface.

At step 338, user 228 may select a template and tune algorithm parameters. For example, the user may select an algorithm template with pre-determined parameters through the first interface, or may select an algorithm type and input all relevant parameters through the second interface. In either case, the machine learning module 218 may receive all necessary details of an anomaly detection algorithm configuration.

Appropriate algorithms may include supervised, unsupervised, or semi-supervised anomaly detection algorithms and techniques such as k-nearest neighbor, support vector machines, Bayesian networks, hidden Markov models, or deep learning. Input parameters and/or model settings may include tuning parameters such as feature data thresholds and relative weighting factors, data pre-processing methods such as smoothing, filtering, and normalization, and alert output criteria such as deviation persistence.

At step 322, the module defines and tests an anomaly detection algorithm based on the algorithm configuration selected at step 338 and the key data features selected in step 336. That is, the module trains and validates a predictive maintenance model. For example, the prepared data features may be divided into complementary training and validation data subsets, and the algorithm trained on the training data subset, then tested on the corresponding validation data subset. In some examples, the machine learning module may receive a selection of training and validation data sets from the user.

The algorithm may be trained and evaluated one or more times, and detailed test results reported to user 228 in GUI 226. Based on the evaluation results, the user may repeat step 338 and trigger a repeat of step 322 by the machine learning module. The GUI may also provide further tools for refining the algorithm, such as alternative training and testing methods and/or error investigation of individual cases.

In some examples, machine learning module 218 may be configured to train and evaluate multiple algorithm configurations, either concurrently or sequentially, and report a comparative analysis in addition to or in place of individual evaluation results. User 228 may repeat steps 338, 322 as necessary until arriving at a satisfactory algorithm configuration. For example, the user may select for desired properties such as high accuracy or low rate of false positives. The user may then trigger step 324 of process 300.

Implementation module 220 is configured to apply the final predictive maintenance model trained by machine learning module 218 to new operational data, detect anomalies in the data, and generate alerts accordingly. Machine learning module 218 may communicate a trained model 234 to implementation module 220, and the implementation module may receive new sensor data 230 from local computer 212. At step 324, the module runs anomaly detection on the new sensor data. The implementation module may then return alerts 232 to the local computer.

Similarly to exploration module 216, implementation module 220 is configured to integrate data saved locally to computer 212. In some examples, the implementation module may also be configured to interface or communicate with external databases or database software. Such connectivity may facilitate ongoing communication with operational databases for automatic generation of maintenance alerts. For instance, remote server 210 may communicate daily with a database of operational data to automatically receive recorded flight data added to the database during maintenance of an aircraft, and issue maintenance alerts before the aircraft returns to service.

B. Illustrative Algorithm Training and Evaluation Module

As shown in FIGS. 4-16, this section describes an illustrative algorithm training and evaluation module having a graphical user interface (GUI) 510, and an associated computer implemented method 400 of algorithm configuration, training, and evaluation. The training module may be part of and/or a sub-module of a machine learning module of a predictive maintenance model design system such as machine learning module 218, described above. The training module may be used to perform steps 338 and/or 322 of process 300, also described above. GUI 510 may be an example of GUI 226, also described above.

The training module is configured to enable a user such as an engineering analyst to configure and train algorithms on large sets of recorded sensor data, and evaluate and compare configurations to arrive at an effective model. Without need for extensive training in programming or data science, the training module allows the user to design anomaly detection algorithms for predictive maintenance. The module GUI may assist the user in selecting or building an anomaly detection algorithm, and optimizing parameters of the selected algorithm.

The training module is also configured to train, test, and verify the performance of an anomaly detection algorithm built by the user. Evaluations of individual algorithms may be provided to the user as tables, lists, and/or visualizations of quantitative metrics such as accuracy, precision, recall, and warning time performance. Comparisons between metrics of multiple algorithm configurations may also be displayed in the module GUI.

Figure 4:
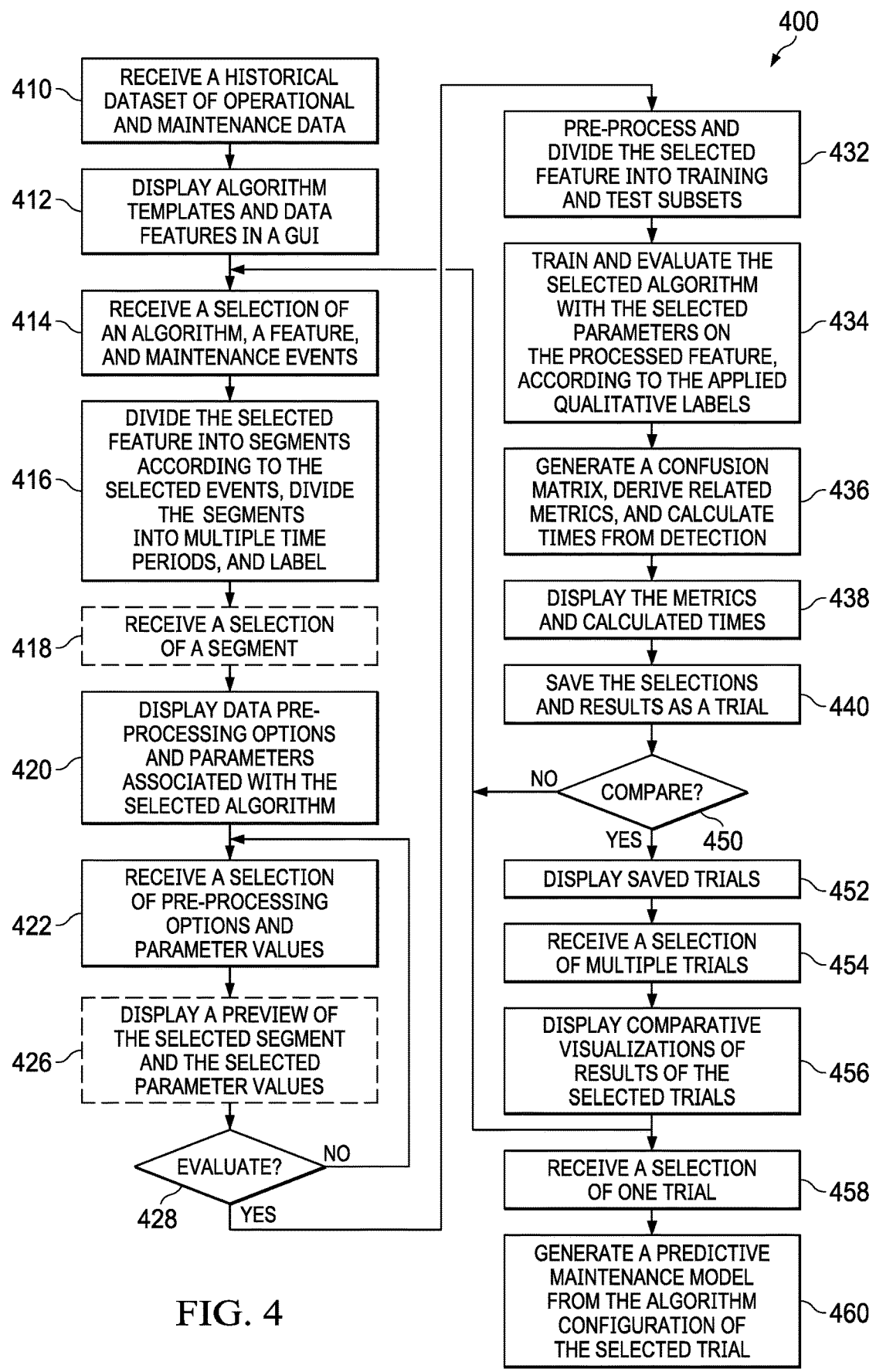
FIG. 4 is a flow chart depicting steps of an illustrative computer implemented method of predictive maintenance model development.

FIG. 4 is a flow chart depicting steps of method 400 of operational data feature evaluation. The feature evaluation module receives selections from and displays data visualizations to the user through GUI 510, shown in FIGS. 5-16.

Step 410 includes receiving a historical dataset of operational and maintenance data. The dataset may consist of time-labeled historical maintenance and sensor data integrated from separate databases, cleaned, and pre-processed for display and analysis, as described in reference to step 310, above.

In the present example the training module is configured for use with data from a fleet of aircraft. The operational data include flight sensor data, digitally recorded by the fleet of aircraft and including readings such as temperatures, pressures, electrical currents, and actuator positions. The operational data include discrete samples in a plurality of time series, each time series recorded over the course of a flight. The maintenance data include records of maintenance events such as scheduled or unplanned component replacements, routine maintenance, and repair work. The records may include aircraft maintenance messages, aircraft fault messages, airline maintenance log entries, crew incident write-ups, shop findings, and/or shop tear-down reports.

In some examples, maintenance events of the maintenance data may be tagged, labeled, or otherwise categorized. For instance, a maintenance event categorization module may be used to divide unplanned removal events into failure modes based on analysis of maintenance record text preceding the events.

In some examples, receiving the dataset may include receiving one or more operational data features. In the present description, the term 'data feature' is used to describe a subset of records of the operational data of the historical dataset, extracted, processed, and/or otherwise prepared for use in a machine learning method. The included data features may be automatically generated by a predictive maintenance model design system, and/or custom created by a user. The training module may receive all data features created in the predictive maintenance model design system, or may receive a set of one or more data features selected by the user.

Step 412 includes displaying algorithm templates and data features in a GUI, such as GUI 510. A plurality of selection tools may be displayed, including one or more algorithm templates and some or all of the data features received with the historical dataset in step 410. GUI 510 includes a plurality of selection boxes and menus, allowing the user to make guided selections from a limited set of options. In general, the GUI may include any number of selection boxes, dropdown menus, radio buttons, text input boxes, and/or any interactive element effective for input of desired constraints or values. All interactive elements may be displayed in a single interface view, or the GUI may include contextual menus, optional windows with additional tools, and/or any features known to one skilled in the art of interface design.

In some examples, the GUI may also be configured for two or more different levels of design control. In the present example, GUI 510 includes a guided design interface 512, shown in FIGS. 5-7, and a modular design interface 514, shown in FIGS. 8-10. Each interface is described further with reference to step 414, below. The guided design interface may be preferable for users with limited experience, while users with greater data science expertise may prefer the greater design control of the modular design interface.

Additionally or alternatively, a single user may use the guided design interface for simple models, and the modular design interface for more complex models. Such a user may also use both interfaces in the course of iterative design and testing of algorithms for a particular project. For example, the user may begin with the guided design interface to create a simple model with low variance but potentially high bias. After experimentation, the user may introduce greater complexity with the modular design interface, to reduce bias. Beginning with a simpler model may help the user avoid high variance, or over-fitting that may be possible with more complex algorithms. Using the evaluations and comparisons as explained further below, the user may thereby make a desirable performance tradeoff between simpler and more complex versions of an algorithm.

Step 414 includes receiving one or more selections of an algorithm, one or more data features, and a plurality of maintenance events. In the present example, all the selections are received from the user, via either guided interface 512 or modular interface 514 of GUI 510. In some examples, the training module may select and/or suggest an optimal set of features.

Guided interface 512 includes an algorithm template selection menu 516, a feature selection menu 518, and a plurality of selection boxes for entering constraints on the plurality of maintenance events to be selected. In template menu 516, one or more algorithm templates are listed. In the present example, the menu includes a simple threshold template and a semi-supervised standard reference anomaly detection algorithm template. The user may select one of the displayed algorithm templates, using menu 516.

In the depicted example, the Simple Threshold template is selected. The Simple Threshold may be selected by default, as a suggestion of an appropriate starting place and/or an accessible option for inexperienced users. After completing steps 416 through 450 or 456, the user may select a more complex template or a template requiring more data science background and repeat the steps to try and achieve desired model performance.

In general, the algorithm templates may include any algorithm appropriate to predictive maintenance. For example, the templates may include single feature anomaly detection algorithms such as k-nearest neighbor, local outlier factor, or isolation forests. Additionally or alternatively, the templates may include complex multi-feature methods such as deep learning, or time series forecasting algorithms such as autoencoders, long short-term memory (LSTM) neural networks, and convolutional neural networks (CNNs). Each template may be an algorithm formulation which has been previously verified by data scientists or other machine learning specialists on predictive maintenance problems.

Selection menu 516 may list all available algorithm templates, or may list a subset of the templates. For example, the menu may list only templates applicable to a maintenance issue specified by the user in another interface or module of the predictive maintenance model design system.

Figure 5:
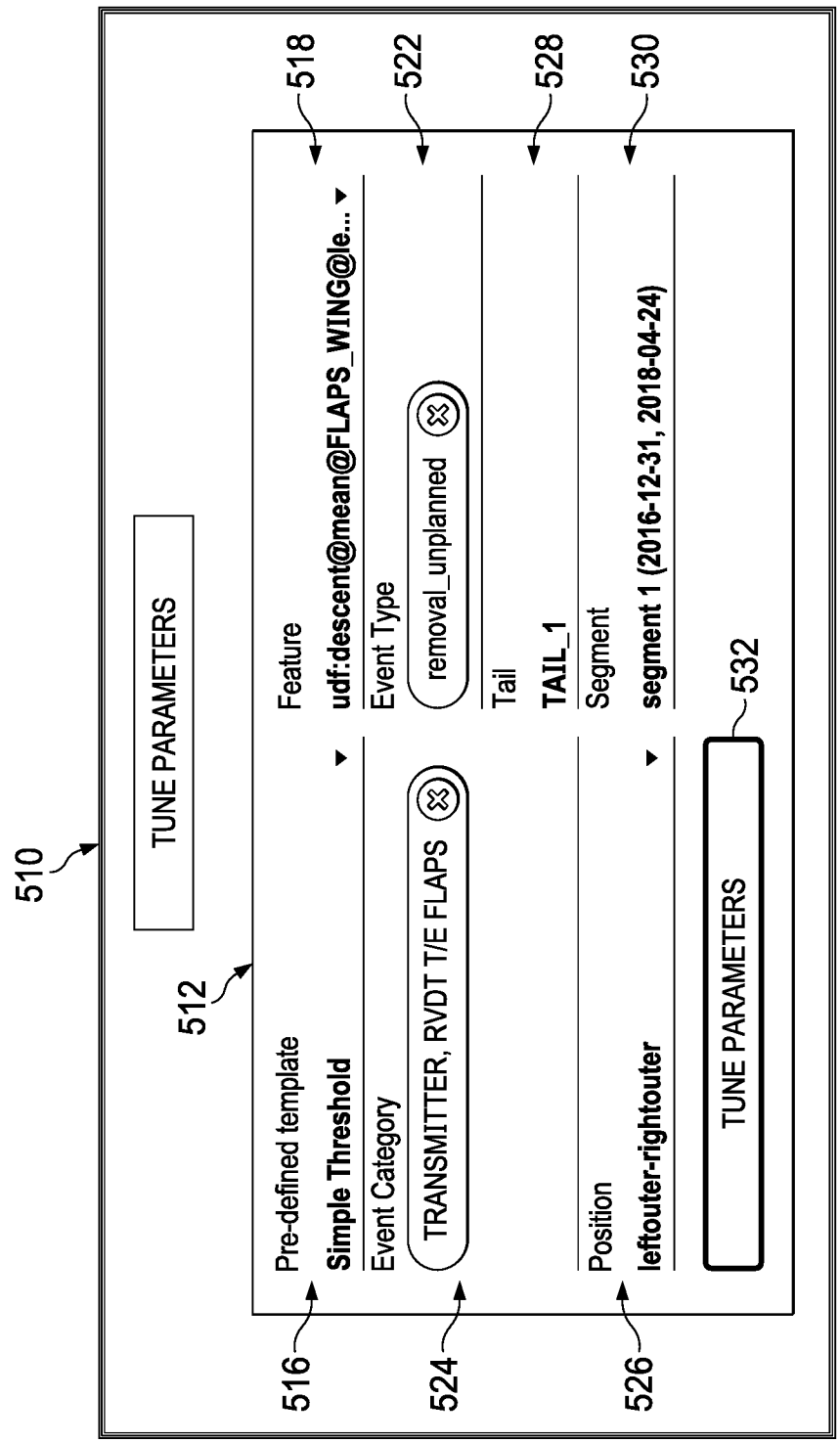
FIG. 5 is a diagram of a guided design interface of a graphical user interface (GUI) of an algorithm training and evaluation module.

In feature selection menu 518, one or more operational data features are listed. The number of data features selectable by the user may depend on the algorithm template selected. For instance, only one data feature may be selected for the Simple Threshold template. In the example of FIG. 5, a user defined feature based on wing flap position during flight is selected. In some examples, more complex algorithm templates such as deep learning or neural network based templates may be compatible with selection of multiple data features.

Selection menu 518 may list all data features received with the historical dataset at 410, or only a subset of data features. For example, a user may select and/or define one or more data features in a data exploration module such as module 216, described above. The selected and/or defined data features may be tagged in the historical dataset, extracted and separately communicated to the training module, or otherwise provided for display in selection menu 518. For another example, selection menu 518 may list a set of automatically generated or pre-selected data features related to a maintenance issue specified by the user in another interface or module of the predictive maintenance model design system.

In the present example, each listed feature is a phase-dependent aggregate operational data feature. As described above, the cyclical nature of aircraft flight can obscure trends and pre-cursor signatures in recorded flight data. Use of phase-dependent aggregate features may therefore improve model performance. In the depicted example, the selected data feature is restricted to the descent phase of flight, and aggregated using a mean function. The listed features may be also be pre-processed to improve performance. For example, seasonal bias may be removed and/or a smoothing filter may be applied.

The user's selection of data feature or features may preferably be informed by data exploration and visualization performed in another module of a predictive maintenance model design system, such as module 216. More specifically, the user may select data features identified as having a predictive pattern or pre-cursor signature useful in predicting maintenance events.

The user may define a selection of maintenance events from the maintenance data of the historical dataset, by specifying constraints on event type, category, and component position. In the present example, at least one maintenance event type must be selected to proceed with method 400, but the category and component constraints are optional. The user may select maintenance events previously identified as related to the selected data feature or features.

An event type constraint is received via a type selection box 522. The user may select any desired number of types. The event types available for selection may depend on what events are recorded in the maintenance logs of the historical dataset, and how the events are logged. For example, the available types may include unplanned removal, scheduled removal, diagnostic test, system alert, and routine maintenance. For another example, addition to a Minimum Equipment List (MEL) may be selected to be used in place of component removal where applicable, as listed equipment may be deactivated but remain installed for some period of time prior to removal.

An event category constraint may be received via a category selection box 524. The user may select any desired number of event categories. The event categories may be part of the received historical dataset, may be generated by another module of a predictive maintenance model design system such as a maintenance event categorization module, and/or may be manually entered by the user using another interface of GUI 510. In some examples, the categories available for selection may depend on the event types selected in box 522. For instance, unplanned removal events may be divided into electrical failure, thermal failure, mechanical failure, and unknown failure.

A position constraint is received via a position selection menu 526. The user may select any desired number of component positions. The positions available for selection may depend on what events are recorded in the maintenance logs of the historical dataset, and what data is associated with a recorded event. For example, each event may be associated to an aircraft component in the historical dataset, and only positions where components are associated with events may be listed for selection. For another example, all positions where a component is mentioned in maintenance log text associated with an event may be listed for selection.

In the example of FIG. 5, events of the unplanned removal type are selected. The events are constrained to a category designated TRANSMITTER RVDT T/E FLAPS' and a user-defined combination of left outer and right outer flaps positions measuring flaps asymmetry during the descent phase of flight and designated "leftouter-rightouter". In general, additional selections for a given constraint may select additional events, while opting to include any selections for the category or component constraints may reduce the number of selected events. In other words, by default all categories and positions are included.

Figure 8:
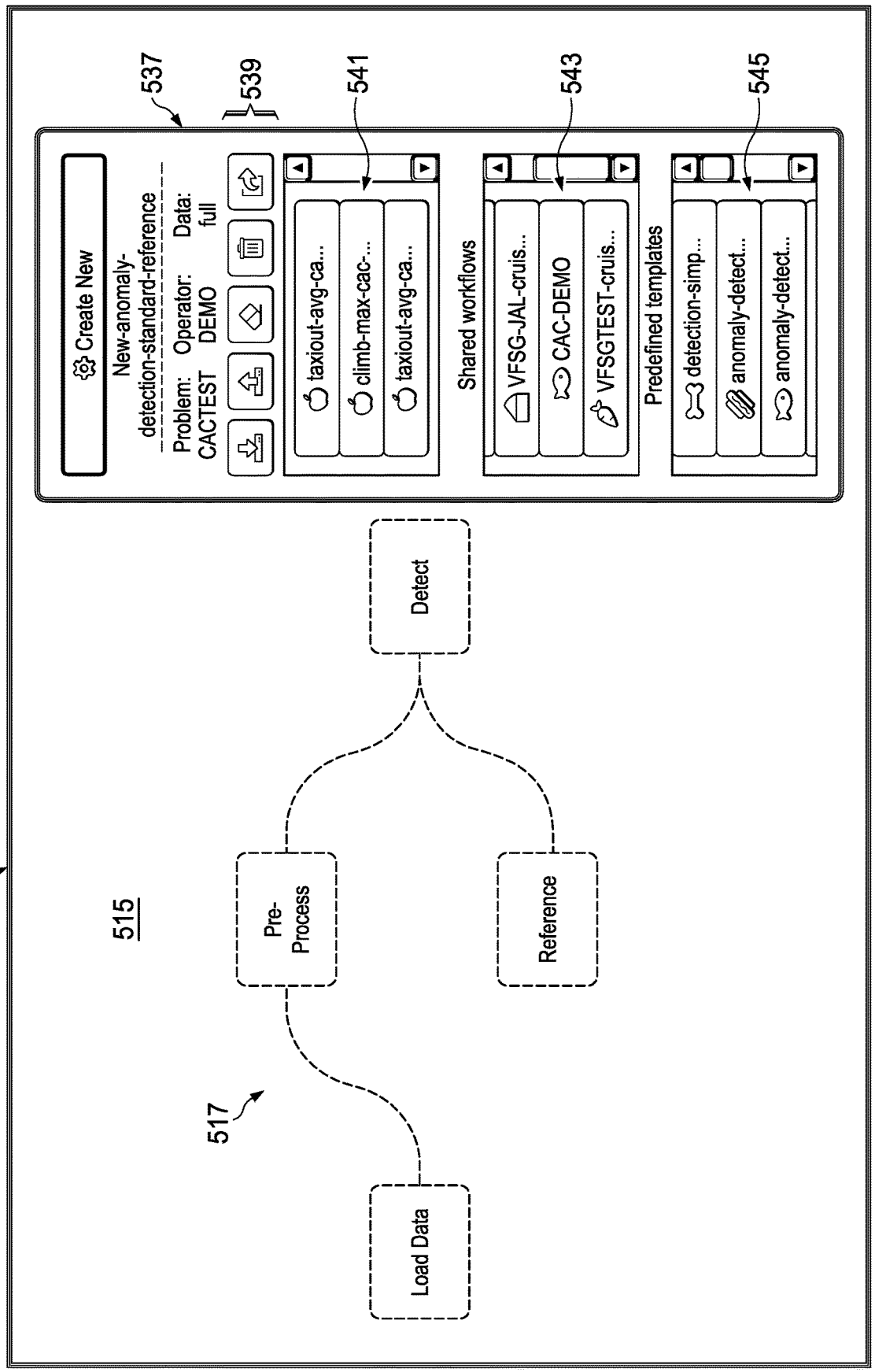
FIG. 8 is a diagram of an illustrative modular design interface of the GUI of FIG. 5.
Figure 9:
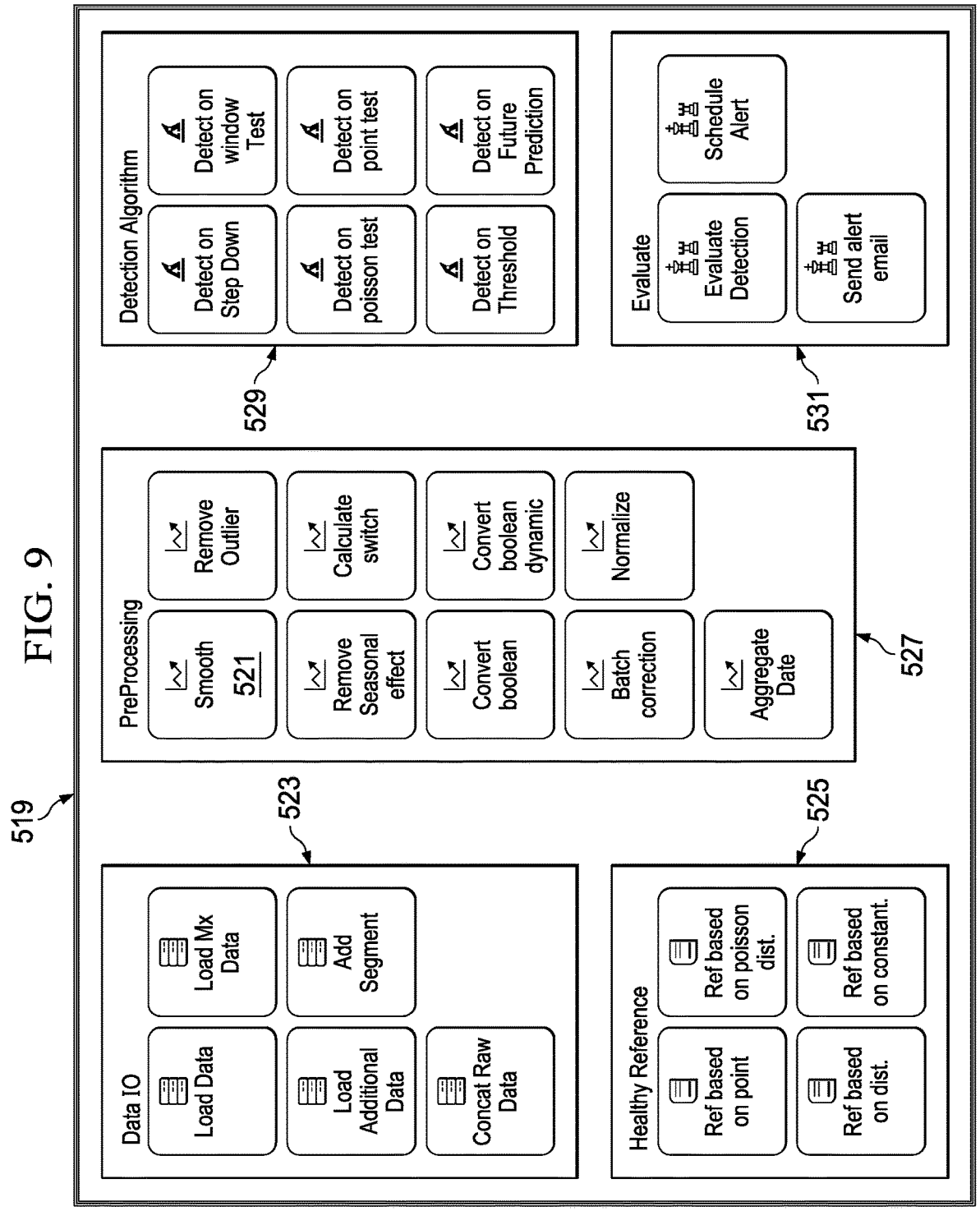
FIG. 9 is a diagram of design blocks of the modular design interface of FIG. 8.
Figure 10:
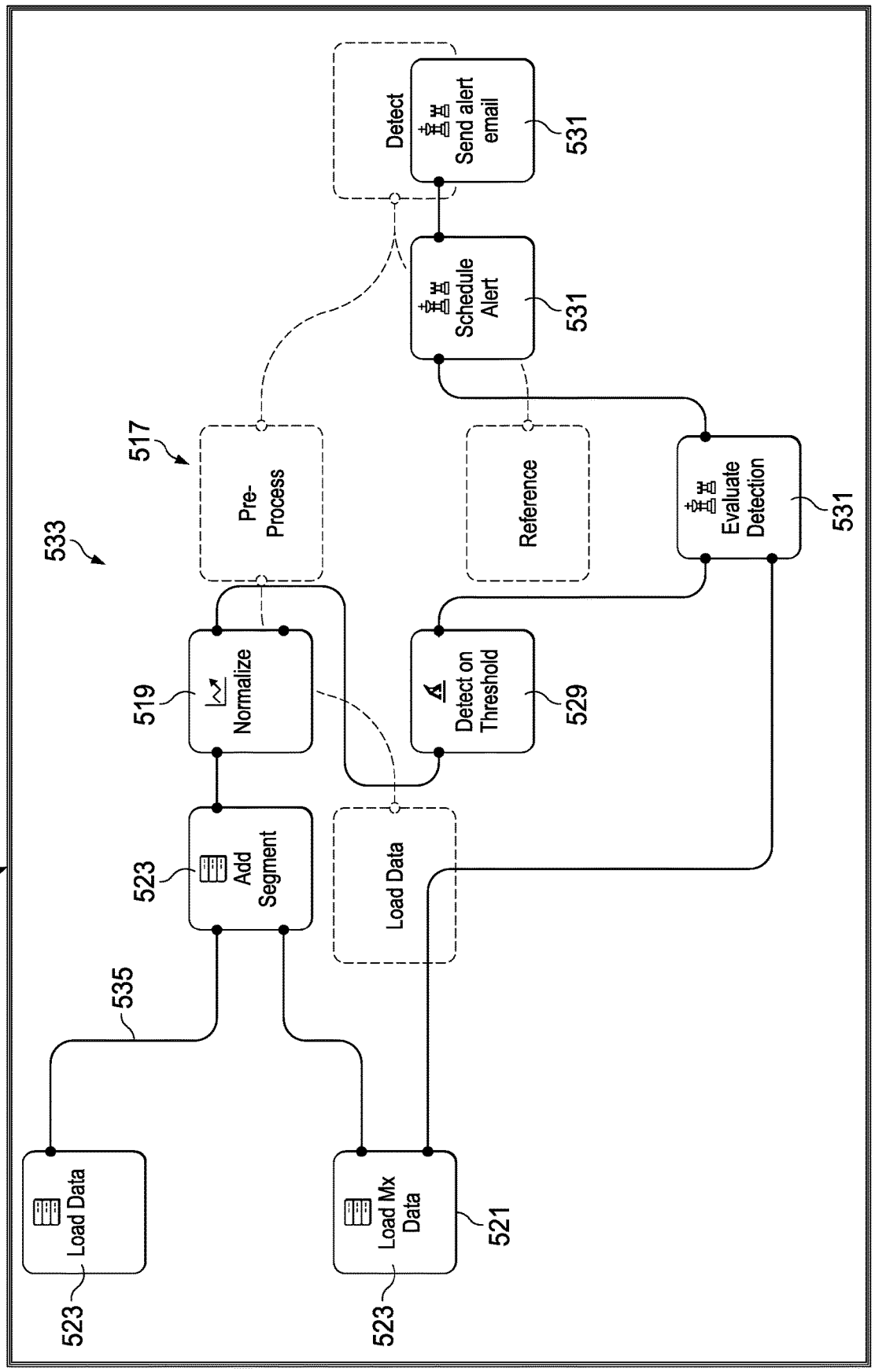
FIG. 10 is a diagram of an illustrative simple threshold anomaly detection algorithm workflow constructed in the modular design interface of FIG. 8.

Modular design interface, as shown in FIGS. 8-10, may be described as a visual workflow editor. The interface includes an editing environment 515 with a guide image 517, and a component block menu 519. The menu includes a plurality of widgets, modules, logic elements, or component blocks 521 which the user can place in the editing environment. Each block 521 represents a feature or step of an algorithm workflow. In editing environment 515, placed blocks can be manipulated and interconnected by the user to form a visual representation of a desired algorithm workflow.

Guide image 517 is included in editing environment 515 to suggest a useful general architecture for workflow development. However, the user may include and arrange blocks as desired. In menu 519, blocks 521 are divided into five classes: data input blocks 523, reference blocks 525, pre-processing blocks 527, algorithm blocks 529, and alert blocks 531. Guide image 517 suggests inclusion of at least on data input block, one pre-processing block, one reference block, and one algorithm block, as well as appropriate connections between the blocks.

In general, block menu 519 may include any block types useful for predictive maintenance model development. Some block types may be particularly suited to specific maintenance issues, desired predictions, or algorithm types. For instance, in the present example reference blocks 525 may be particularly useful in workflows using semi-supervised standard reference anomaly detection, which in turn may be particularly suited to aircraft predictive maintenance models.

In the present example, functions of data input blocks 523 include connecting a flight data feature or a set of maintenance data as a workflow input, specifying an a separate data source, adding additional information to raw flight data from other sources, and segmenting flight data based on maintenance events. Functions of pre-processing blocks 527 include applying a rolling window filtering function, removing outliers based on selected filtering criteria, removing a calculates best-fit seasonal bias, converting feature data to binary data by comparison to a user specified threshold, converting feature data to binary data by comparison to a threshold generated based on designated healthy flight data, normalization, aggregating multiple flights occurring on one day to one data point, correcting bias resulting from batch combination, and calculating an on or off status for equipment based on flight data.

In the present example, each function of reference blocks 525 includes creating a healthy reference distribution for use as a baseline reference in anomaly detection. The reference can be determined from a random sampling of input data using sets of consecutive flights, generated by fitting a Poisson distribution to the input feature data, generated by fitting a normal distribution to the input feature data, or based on a user-specified constant healthy reference value. Algorithm blocks 529 include anomaly detection algorithms that detect on step-down, using a window test, using a Poisson test, using a point test, on comparison to a threshold, or on comparison to a future prediction In the present example, functions of alert blocks 531 include evaluating each detection generated by the algorithm against historical maintenance data, scheduling the deployed algorithm to run on live operational data, and communicating an alert such as a notification email when the deployed algorithm detects an anomaly in live data.

FIG. 10 depicts an illustrative workflow 533 for simple threshold detection. The workflow is made up of eight blocks 521, three data input blocks 523, one pre-processing block 527, one algorithm block 529, and three alert blocks 531. The blocks are ordered and connected by operative connection lines 535. Together the blocks construct a workflow that loads operational data features and maintenance data, and divides the data features into segments according to events of the maintenance data. The workflow normalizes the segmented data, and performs anomaly detection with a simple threshold algorithm. Finally, the workflow evaluates the generated detections, schedules and then sends alerts accordingly.

Each block 521 is further configurable. Once placed in editing environment 515, the user may select the block to open a contextual menu with configuration options specific to the block. For example, the user may select a pre-processing block 527 to input a parameter regulating data pre-processing such as smoothing window size, normalization pool, or aggregating function. For another example, the user may select an algorithm block 529 to input parameter values such as an operational data feature value threshold, a statistical significance threshold, or a persistence threshold. The input parameters may be learned model parameters and/or hyperparameters depending on the model type and complexity.

Modular design interface 514 further includes a workflow management pane 537, to facilitate saving, sharing, and modification of workflows. For example, the user may return to a saved workflow to make modifications after reviewing evaluation results. For another example, the use may access a workflow created using the guided design interface to introduce additional complexity, add features not available in the guided design interface, and/or otherwise modify the workflow. For another example, the user may access a template workflow as a starting point for workflow design, or may save a basic workflow for future use as a custom template.

Using the management pane, the user may create a new workflow or load an existing workflow for editing. Management pane 537 displays a name of the workflow currently loaded in editing environment 515, and includes icon buttons 539 for importing, exporting, saving, deleting, and sharing workflows. Also displayed are a list 541 of saved workflows, a list 543 of shared workflows, and a list 545 of predefined workflow templates which may each be selected. In some examples, the templates of list 545 may include the algorithm templates displayed in the guided design interface.

Once a selection of data features and maintenance events are received via selection menu 518 and selection boxes 522, 524, 526 of guided design interface 512 as shown in FIG. 5 or via modular design interface 514 as shown in FIGS. 8-9, the training module proceeds with step 416 of the method.

Step 416 includes dividing the time-labeled operational data of each selected data feature into segments, according to the selected maintenance events. The data feature includes a data profile for each aircraft, and each component position from which data was recorded. Each aircraft data profile is divided according to those of the selected maintenance events associated with the respective aircraft and component position. For example, an engine temperature data feature may include data profiles associated with a left engine and data profiles associated with a right engine. For each aircraft, a left engine data profile will be divided according to left engine maintenance events, and a right engine data profile will be divided according to right engine maintenance events. In examples where a data feature definition involves multiple positions, such as a difference between right and left engine temperatures, the user may select which maintenance events to use in segmentation, for instance left engine maintenance events only or all engine maintenance events. Accordingly, each data segment is associated with an aircraft tail number, a component position, and a maintenance event.

Between the recorded time of each maintenance event and the next subsequent event, a segment is defined. The segment is associated with the subsequent maintenance event and corresponding component. Data recorded up to a first event is also considered a segment, as is data following a last event. The number of segments will depend on the number of aircraft, and the number of events selected. Each data segment is labeled according to the defining preceding and succeeding events. When a removal event type is selected, each segment may represent the installed lifetime of a particular component Step 416 further includes dividing each segment of operational data into selected time periods. That is, each segment is divided into multiple time periods according to a selected threshold time, or selected time relationship to the associated maintenance event. In the present example, the selection includes first and second threshold times such as x-number of days and y-number of days, and each segment is divided into three time periods. The selection may be received from the user through another module, may be pre-determined, and/or may be automatically selected by the training module.

For each segment, the first time threshold and the second time threshold are measured backward in time from the associated maintenance event. The sensor data of the segment prior to the first threshold is assigned to a first time period and the sensor data following the second threshold is assigned to a second time period. All other sensor data of the segment is assigned to a third time period.

Step 416 further includes labelling the data associated with each time period. In the present example, the assigned qualitative labels are healthy, degraded, and unknown. In some examples, the label undetermined may be used. More specifically, all data assigned to the first time period is designated as healthy, all data assigned to the second time period is labelled as degraded, and all data assigned to the third time period is labelled as unknown. In other words, sensor data in a period of time greater than x-number of days prior to a maintenance event is assumed to reflect healthy operation, while sensor data in a period of time less than y-number of days prior to the maintenance event is assumed to reflect degraded operation.

The depicted time periods are labeled for use with unplanned removal events, to assign healthy and degraded labels based on an assumption of component degradation leading to the unplanned removal. In the present example, the training module applies only the healthy, degraded, and uncertain labels. In some examples, the training module may allow input of other labels, and the user may define any informative time periods prior to a selected event type. For example, a user investigating effects of routine maintenance on aircraft performance might designate time periods corresponding to theorized optimal maintenance intervals.

Optional step 418 includes receiving a selection of a segment. The selection may be received via an aircraft selection menu 528 and a segment selection menu 530, of guided design interface 512. The user may first select an aircraft in menu 528, and then a list of associated segments may be displayed in menu 530. The selected segment may be used for a graphical preview as described in reference to step 426 below, and the user may repeat step 416 to select another segment as desired. When using the modular design interface, step 418 may be omitted.

Step 420 includes displaying data pre-processing options and parameters associated with the selected algorithm. The displayed parameters may be learned model parameters and/or hyperparameters, depending on the algorithm type and complexity. In guided design interface 512, the user may select parameter button 532 to proceed with step 420. In modular design interface 514, the user may access the contextual configuration menu of a selected algorithm block and/or pre-processing blocks of the component block menu, as described with reference to FIGS. 8-10, above.

Figure 6:
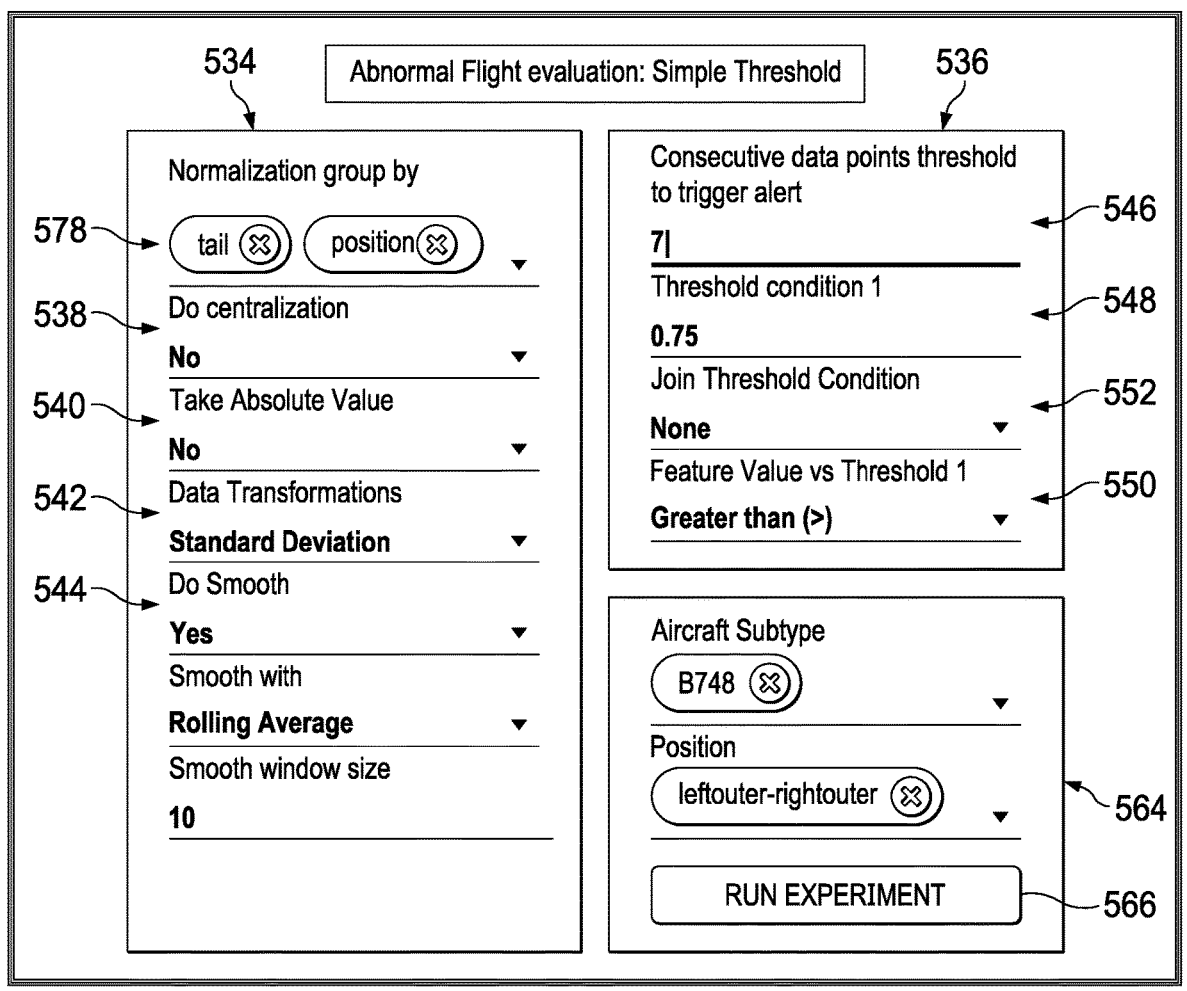
FIG. 6 is a diagram of a data pre-processing configuration pane, a hyperparameter selection pane, and an experiment pane of the GUI of FIG. 5, for an illustrative simple threshold algorithm.

In the present example, button 532 in the guided design interface opens pre-processing and parameter panes as shown in FIG. 6. Each pane may be configured according to the selected algorithm template. That is, the pane may include different guidance, selection boxes, and/or interactive elements appropriate to the selected template. For instance, the depicted panes are configured for the selected Simple Threshold template, and include input boxes for threshold conditions. In general, step 420 may include displaying any interface, selection tools, feedback, and/or user guidance useful in configuration of the selected algorithm template.

Step 422 includes receiving a selection of pre-processing options and parameter values. The step may be repeated multiple times in method 400, with results of the selections in subsequent steps saved as trials, as described further with reference to step 440 below. The algorithm configuration, training, and evaluation method may be described as iterative, with repeated selection of data processing configuration and algorithm parameters. The user may use insights gained from visualizations of algorithm evaluations to inform a subsequent selection of parameter values, and so on.

In some examples, GUI 510 may allow the user to specify a plurality of trials to perform concurrently, which may be referred to as a grid search selection. For example, the user may specify a set of multiple data feature thresholds and/or variations on data pre-processing parameters. Each combination of input parameters may be saved as a separate trial, as described below. In such examples, step 426 and decision 428 may be omitted, and steps 432-440 may be automatically repeated by the training module concurrently or in sequence, without requiring the user to repeat step 422. In this manner, the user may set up a grid of variations to more efficiently find an optimal result.

In the example of the modular design interface as depicted in FIGS. 8-10 and described further above, selection of pre-processing options is received based on placement and configuration of pre-processing blocks. Parameter values are similarly received by configuration of a placed algorithm block or blocks.

In the example of the guided design interface as depicted in FIG. 6, selections of data pre-processing options are received via processing pane 534, and parameter values are received via parameter pane 536. Data pre-processing options and parameter values may also be received by addition and/or configuration of component blocks in the modular design interface, as described with reference to step 414, above.

Processing pane 534, as shown in FIG. 6, is configured for normalization, centering, and smoothing, as well as application of an absolute value function and/or another statistical function. In general, any useful data transformation or other pre-processing may be supported.

A normalization group selection box 578 allows selection of constraints on a pool of feature data used for statistical calculations. For a semi-supervised anomaly detection algorithm the normalization group selection may also apply to calculation of a healthy reference. When no constraints are selected, all available feature data is used. In the present example, the group may be constrained by tail, position, and/or segment. In other words, data may be drawn from the entire aircraft fleet, separately for each aircraft, or per component position on each aircraft. A recommended selection of tail and position constraints are selected by default. For example, independent normalization of each data segment may selected by default. Such normalization may reduce or eliminate noise from changes in data value bias following component replacement that are a result of individual component variance and do not reflect predictively significant value change.

A centralization menu 538 allows implementation of a shift of zero for all feature data, such that data points are equally distributed above and below the median value. An absolute value menu 540 allows application of the absolute value function to the feature data, converting any negative values to positive. A transformation menu 542 allows selection of a standard deviation transformation, a log transformation, or neither. The selected transformation is applied to all feature data. Each of the processing options of menus 538, 540, and 542 are off by default.

Smoothing boxes 544 allow application and configuration of a rolling window filtering function. The boxes include selection of either a rolling median or rolling average, and input of a number of flights for the smoothing window. In some examples, other smoothing and/or filtering functions may also be selectable.

In the depicted example, the wing flap position asymmetry data feature will be normalized according to tail and position, and smoothed by a rolling average filter with a window size of 10 flights. The data will be transformed by application of a standard deviation function.

Parameter pane 536, as shown in FIG. 6, allows input of four parameters defining detection criteria. As discussed above, the parameters are specific to the selected simple threshold algorithm. Each template may include a set of parameters and default or recommended values. In some examples, one or more of the parameters may be automatically determined or suggested by the training module. For instance, the module may automatically determine a recommended detection threshold using a machine learning method.

A threshold value entry box 548 allows input of a feature value used to determine whether a data point and corresponding flight are anomalous. The units of the input value may be those applicable after pre-processing as selected in processing pane 534 has been performed. A threshold selection menu 550 allows selection of a logical condition to use in applying the threshold value entered in box 548. In the present example, the options include greater than, less than, equal to, greater than or equal to, or less than or equal to. For instance, based on the depicted entries of FIG. 6, all data points with a value greater than 0.75 are anomalous.

A join condition selection menu 552 allows selection of a logical operation for combining multiple thresholds. Listed options include 'and', 'or', and none. When none is selected as in the example of FIG. 6, only a single threshold value entry box 548 and threshold selection menu 550 are displayed. When 'and' or 'or' are selected, an additional threshold value entry box and corresponding threshold selection menu are display, to permit entry of a second threshold value and condition. The selected join condition is then used as a logical or Boolean operator to combine the two entered thresholds as a single criteria for anomalous data points.

A persistence threshold entry box 546 allows input of a number of data points. The received value sets the number of consecutive anomalous flights before an anomaly is detection by the algorithm.

For other templates, parameters may include, but are not limited to feature data thresholds, algorithm behavior characteristics such as regularization parameters, and threshold statistical significance level for a binomial test on an observed sequence of flights or in other words, confidence in abnormality relative to a historical reference. For multivariate detection models, parameters may include relative weighting factors, for tuning the weight of each input feature. When relevant to the selected algorithm, weighting factors may be automatically optimized, and/or received from the user.

Optional step 426 of method 400 includes displaying a preview of the selected segment and parameter values. The preview may be displayed in guided design interface 512, but omitted from modular design interface 514. Similarly to step 422, the preview displayed may be dependent on the algorithm template selected. Any useful graphs, charts, plots, tables or other data visualizations may be included in the displayed preview. In the present example, the preview is available only in the guided design interface. In some examples, a preview may be displayed on-demand through the modular design interface.

Figure 7:
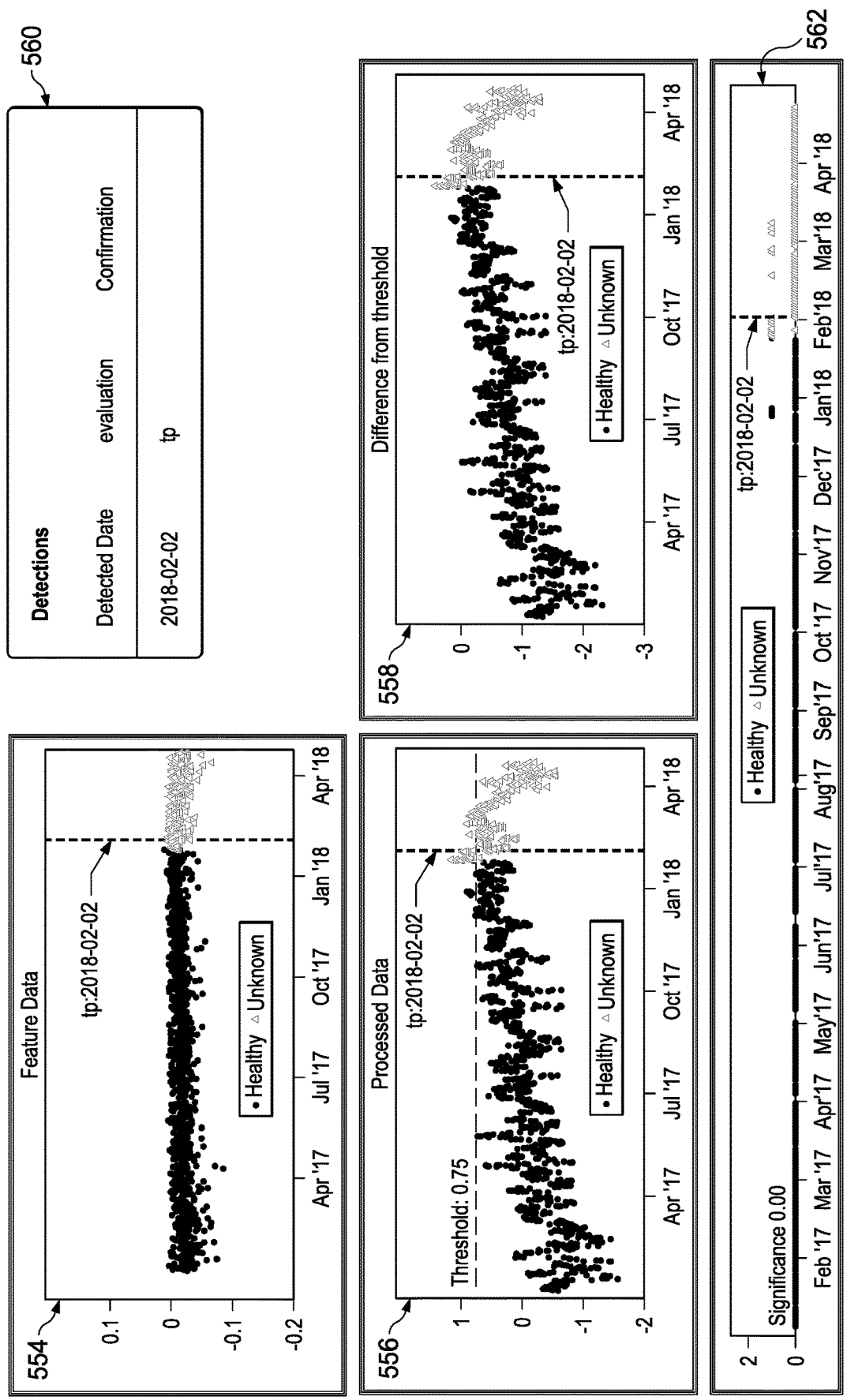
FIG. 7 is a diagram of a graphical preview display of the GUI of FIG. 5, for the illustrative simple threshold algorithm, according to the illustrative selected configuration of FIG. 6.

As shown in FIG. 7, for the selected simple threshold template the preview includes a feature data graph 554 and a processed data graph 556, a threshold comparison graph 558, a detection table 560, and a significance plot 562. The displayed preview updates in real time as the input to panes 534 and 536 is altered. The small sample of a single feature segment may provide feedback to the user as to the effect of the specified parameters, while creating sufficiently small computational load as to allow dynamic real-time updates. Such responsive visualization may facilitate rapid, flexible configuration of the algorithm template.

In feature data graph 554, data values for the selected segment of the selected feature are graphed over time. In processed data graph 556, data values for the selected segment are pre-processed according to the selections of pane 534 and then graphed over time. The entered threshold value from box 548, and if applicable any additional entered threshold value, is represented on graph 556 as a horizontal line.

Graphs 554 and 556 may help the user to visualize the transformation of the data made by the user's selections in pre-processing pane 534. Processed data graph 556 may provide the user a visual comparison of the processed data and the selected threshold. Such visual comparison may avert confusion due to unit transformation or elimination of negative values, and allow the user to make a visual evaluation of the selected threshold.

In threshold graph 558, a calculated difference between each data point in the selected segment and the entered threshold value is graphed over time. Visualization of this difference may further facilitate evaluation of the entered threshold.

Each detected anomaly in the selected segment is listed in detection table 560. The table includes the date of the detection and an evaluation of the alert. The detection is evaluated based on proximity in time to the associated maintenance event of the selected segment. Each detection may be designated as either true positive (tp) or false positive (fp). Significance plot 562 depicts an anomaly profile of the selected segment. That is, each non-anomalous data point is plotted as having a significance value of 0, and each anomalous data point is plotted as having a significance value of 1. Significance plot 562 shows all anomalous flights as well as detections from recurring consecutive anomalous flights, and may allow the user to see whether anomalous flights are prevalent apart from the detected anomalies, and to evaluate the entered persistence threshold.

In each of graphs 554, 556, 558, and 562, division of the segment into healthy, degraded and unknown time periods is indicated by color or shape of the data points and a corresponding key. Detections made by the algorithm are also indicated in each graph, by a vertical dotted line. Each line is labelled and/or color coded as a true positive or false positive detection. This may allow the user to visually assess the relationship between the data profile, threshold, resulting detections, and assumed component health.

At decision 428, the user may choose whether to proceed with evaluation of the algorithm configuration selected in steps 414-422. If not satisfied (Evaluate=No) with the selected configuration, the user may instead return to panes 534 and 536 or to the modular design interface to repeat step 422. In some examples, the user may return to step 418 to select other segments in order to preview other data segments under the selected configuration.

Once satisfied (Evaluate=Yes) with the algorithm configuration based on the preview displayed at step 426, the user may trigger evaluation using a run button 566 of an experiment pane 564 as depicted in FIG. 6. The run button triggers automatic creation of an end-to-end algorithm workflow by the training module, based on the selections of steps 414 and 422. In examples where a grid search selection is available, run button 566 may be used to initiate multiple trials and/or another GUI element may be used.

In experiment pane 564, the user may define a subset of data from the selected data feature to be used in training and testing of the algorithm. More specifically, the user may limit the type of aircraft and the component position of the data to be used. In some examples, the experiment pane may further support definition of training and test sub-sets as discussed further with respect to step 432, below.

Step 432 of method 400 includes pre-processing the full selected data feature or features. That is, pre-processing each of the data segments created at step 416. In examples where the user defines a data subset in the experiment pane, data segments of the defined subset are pre-processed. The feature data is processed according to the selections received from the user at step 422.

Step 432 further includes dividing the processed feature data into training and test subsets, which may also be described as training and validation datasets or a training dataset and a testing dataset. More specifically, the step includes dividing the set of processed data segments into disjoint complementary training and test subsets. The data may be divided according to any validation technique known in the art, including but not limited to simple division, k-fold cross validation, and leave one out cross validation. The data may be divided once, into two sets, and/or may be repeatedly divided into a plurality of pairs or groups of sets for repeated training and testing.

In the present example, the feature data is divided by the training module. The data is randomly divided according to a pre-determined percentage split such as 70% training data and 30% test data. The percentage may depend on the selected algorithm template. For instance, all data may be used as test data for the simple threshold algorithm template. In some examples, the user may input rules defining training and test data subset divisions. For instance, the user may select a validation technique from a list of available techniques, the user may input a percentage split, k-value or other parameter for a selected technique, and/or the user may manually divide the feature data.

In an example, the user may create separate training and test data sets by creating separate analysis sessions, each with a different time range of historical data. An algorithm may be developed in a first session on a first selected set of data, and then the algorithm may be evaluated against a second selected set of data in another session. The first and second sets of data may be selected to not overlap. In another example, the training module may support designation of data subsets to hold out for testing, such as data relating to a subset of the aircraft of the fleet.

Step 434 includes training and testing (e.g. evaluating) the selected algorithm with the selected parameters on the processed feature, according to the applied qualitative labels. Training may be conducted according to known methods for the selected algorithm template. For example, the simple threshold algorithm of the depicted example is not a learning algorithm and therefore training may be performed manually by the user through repeated trials. For another example, a supervised or semi-supervised learning algorithm may be trained using the data segments and labels of the training data subset as training examples. For another example, a neural network or a deep learning algorithm may be trained by optimization of weights of the network or algorithm.

Step 434 may include training the selected algorithm once, or may include repeated training as part of a training technique, validation technique, and/or meta-algorithm. For example, the algorithm may be repeated trained on different training data sets and then averaged for a final trained model, as part of cross validation. For another example, boosting, stacking, and/or bootstrap aggregating may be used.

Testing of the trained algorithm may be conducted according to a method associated with the algorithm template selected using the guided design interface or incorporated into the workflow created using the modular design interface. In some examples, the training module may automatically select an appropriate validation method for the selected algorithm, or the user may select a validation method as part of dividing the feature data at step 432.

The trained algorithm may be evaluated on detection of the maintenance events included in the test data set, as assessed by a time relationship between a detection and the maintenance event. More specifically, the algorithm may be evaluated on whether detection events occur within the labeled degraded period of the test data segments. Such testing is based on the premise that successful detections will occur within a certain time period prior to a maintenance event, and that detections long before an event are false. For instance, it may be assumed that detection of a signature of component degradation will occur within a limited time period before replacement is necessitated, and not immediately after a replacement is made.

At step 436, the method includes generating a confusion matrix, deriving related metrics, and calculating times from detection. This step may be performed using results of the training and evaluation of step 434. The confusion matrix may be generated by comparing each detection by the final trained algorithm and each maintenance event of the test data set and compiling a list of true positives, false positives, and false negatives. In the present example true negatives are omitted from the confusion matrix as unhelpful to performance insight for anomaly detection. However, in the present example, the confusion matrix further includes suspect positives.

The confusion matrix may be generated according to the data labels applied at step 416, and/or any appropriate qualifications. In the present example, detections falling within a time period labeled as degraded are counted as true positives. Detections falling within a time period labeled as healthy or uncertain are counted as false positives. Detections falling within a data segment not yet bounded by a maintenance event, that is detections within the most current data that reflect data collected for currently installed components, are counted as suspect positives. Each maintenance event for which no detection falls within the degraded time period of the associated data segment is counted as a false negative. In some examples, alternative confusion matrix definitions may be used and/or the user may input desired confusion matrix, evaluation, and/or labeling rules.

Quantitative metrics are derived from the confusion metric counts. The derived metrics may include standard metrics known in the art such as accuracy, precision, recall, and/or F score. The derived metrics may additionally or alternatively include custom metrics pre-determined or defined by the user as mathematical combinations of one or more of the confusion metric counts. A time from detection is also calculated for each detection, which may be referred to as time from detection to event or warning time. The time from detection may be a number of days or flights between the detection and the maintenance event associated with the data segment in which the detection falls.

Figure 13:
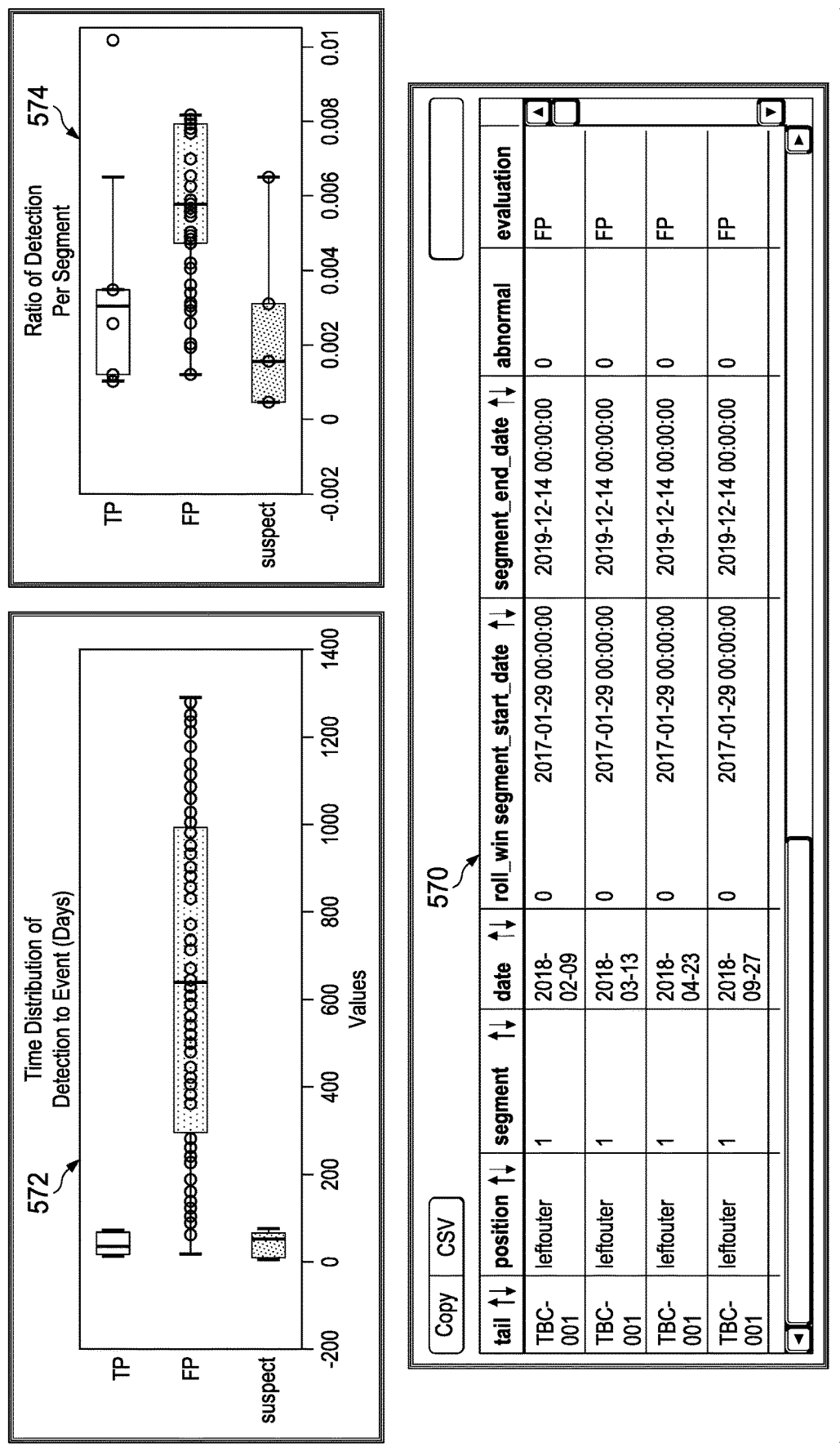
FIG. 13 is a diagram of illustrative comparative evaluation result visualizations of the GUI of FIG. 5.

Step 438 includes displaying the metrics and calculated times from step 436. In general, any desired graphs, charts, plots, and/or tables may be displayed in GUI 510. In some examples, the training module may allow the user to select desired visualizations for display. In the present example, two tables and two graphs are displayed, as shown in FIGS. 12 and 13. The displayed visualizations include a quantitative metric table 568, a detection detail table 570, a warning time distribution plot 572, and a segment detection ratio plot 574.

As shown in FIG. 12, metric table 568 lists each confusion matrix count, each metric derived from the confusion matrix counts, and the calculated time from detection. Associated with the table is a filter pane 576 and a search box. The user may search for key word text of interest, and/or filter the detections included in the counts displayed in metric table 568. The filter fields may depend on the parameters selected at step 422. In the depicted example, the user may filter the included detections by aircraft model, event type, event component position, and/or event category. Metric table 568 may dynamically update based on the user's search and filter pane inputs.

As shown in FIG. 13, in the present example, warning time distribution plot 572 and segment detection ratio plot 574 are each box and whisker plots, and each are plotted for each of the three types of detection: true positive, false positive, and suspect positive. The warning time distribution plot displays the time of detection relative to the actual event time, and the segment detection ratio plot is a statistical box plot of the ratio of the number of each type of detection to the total number of flights per segment. That is, a ratio of the number of detections in a segment to the total number of flights in that segment, over all segments of the test data, is plotted for each type of detection.

Detection detail table 570 lists detailed information for each detection. Each row of the table corresponds to a detection, and the columns include information regarding the detection and the associated data segment and/or maintenance event. For instance, the depicted table includes event component position, segment, date of detection, rolling filter window, start and end date of the segment, number of abnormal data points, and the confusion matrix designation for the detection.

This depicted selection of plots and tables may allow the user to assess algorithm performance on an overall level, drill down to individual detection cases, and/or investigate specific performance questions of interest. On cursor hover over plots 572, 574 additional data specifics may be displayed in a contextual label. In some examples, the user may be able to select a row of table 570 to return to step 422 and the processing and parameter panes for deeper investigation. GUI 510 also supports export of the results, to facilitate use of other data analysis and/or visualization programs, or any analysis technique desired by the user.

Step 440 of method 400 includes saving the selections and results as a trial. More specifically, the step includes saving the selections received at steps 414 and 422 as well as the confusion matrix, derived related metrics, and calculated times to detection of step 436. In examples where additional algorithm configuration selections are received and/or additional metrics calculated or other results generated from evaluation of the trained algorithm, such additional information may also be saved.

Figure 11:
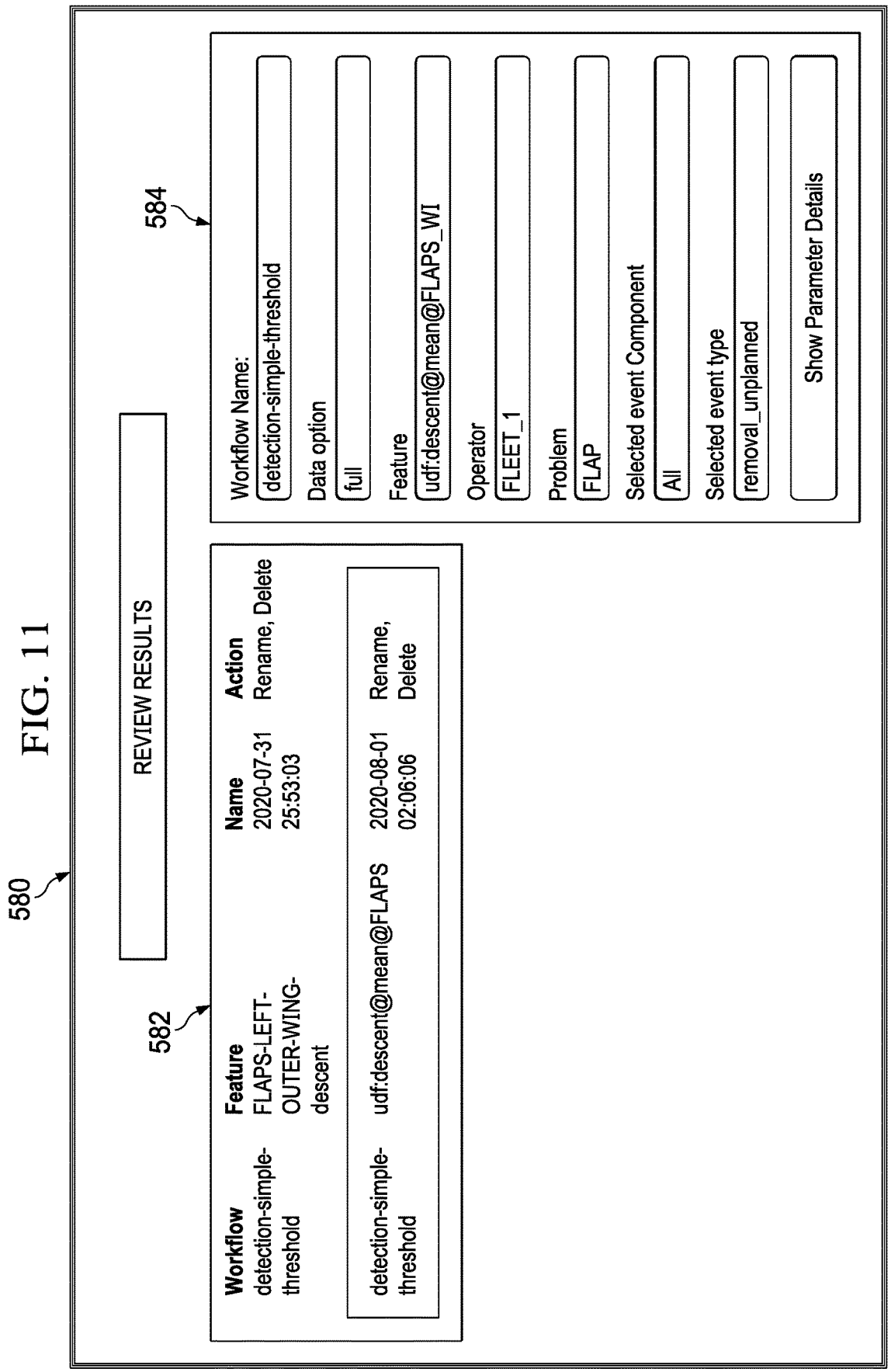
FIG. 11 is a diagram of an illustrative trial selection pane of the GUI of FIG. 5.

The saved information may be designated as a trial, as an experiment, or as any useful designation. Each saved trial may be labeled with a unique name or set of identifying information. As shown in FIG. 11, the user may then be able to access the saved trial in an evaluation results interface 580. The interface includes a trial list pane 582 and a trial detail pane 584. In the trial list pane, all trials saved by the user are listed with a workflow name, the data feature used to train the algorithm, and a trial name.

When the workflow is generated by the guided design interface, the workflow name is a pre-determined name associated with the selected algorithm template. When the workflow is generated by the modular design interface, the workflow name may be automatically generated based on the component blocks used and/or selected by the user. By default the trial is assigned a name based on the date and time of saving, but the user may rename the trial as desired. The user may use trial list pane 582 to select a trial to access, and/or to delete any trials no longer of interest.

When the user selects a trial in trial list pane 582, trial detail pane 584 displays further details of the trial. In the present example, a name of the selected algorithm template or workflow, a characterization of the data selection, the selected data feature, an aircraft fleet, a selected maintenance problem of interest, a selected event component and event type are all displayed by default. The user may select the Show Parameter Details button to further display all details of selected algorithm parameters.

The user may choose to repeat step 438 for any saved trial. More specifically, the user may select a saved trial using interface 580 and opt for the GUI to display the saved results as in step 438. In some examples, step 440 may be performed prior to step 438. That is, once training, evaluation, and calculation of results are complete the associated data may immediately be saved as a trial. The user may then access interface 580 to select the saved trial and view a display of the calculated results.

Retaining results for each evaluated algorithm configuration may provide significant assistance to a tuning and optimization process. In effect, the training module supports creation of multiple versions of an algorithm, with each iteration possessing different parameter values, in order to find an optimal configuration for operational deployment. The user may run through a range of tuning parameters in order to find a set that is close to optimal in terms of desired performance. This process may be described as a grid search over a range of values for each parameter. In some examples, the optimization process may be performed by the training module, and a near-optimal set of parameters may be displayed to the user for a selected target performance.

The training module may further support sharing of saved trials and/or algorithm configurations with other users. For example, the training module may create distinct user sessions, allowing the user to work on investigating multiple questions separately, and/or multiple users to work independently. The training module may support export of a received set of selections and/or associated evaluations results to another format, or to other data processing software.

Figures 14, 15:
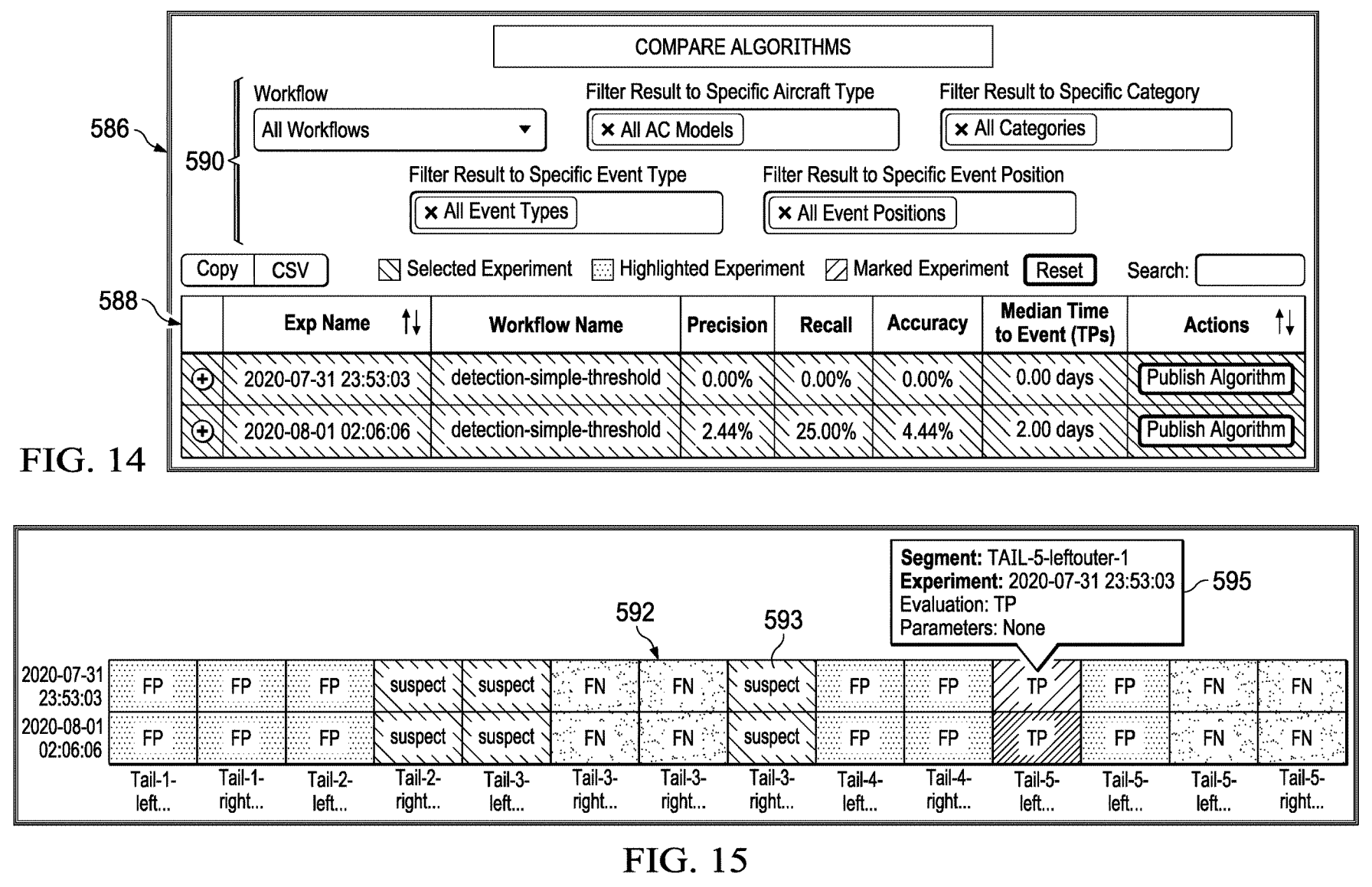

At decision 450, the user may choose whether to proceed with comparison of multiple saved trials, generated by repetition of steps 414-440. If not satisfied (Compare=No) with the trials saved, the user may instead return to guided design interface 512 as depicted in FIGS. 5-7 or modular design interface 514 as depicted in FIGS. 8-10, to repeat step 414. In some examples, the user may return to step 422 to tune parameters of an existing workflow previously generated from an algorithm template or in the modular design interface. Once satisfied (Compare=Yes) with the saved trials, the user may continue with step 452 and access a comparative interface 586 as depicted in FIG. 14.

Step 452 includes displaying saved trials. In the present example, trials are listed in a table 588 of comparative interface 586. By default all trials saved by and/or shared with the user may be listed in the table. In table 588 each trial is listed by name, and further identifying details displayed. In the present example the workflow name, and evaluation metrics of precision, recall, accuracy, and median time to event are displayed.

The interface further includes filtering tools 590, allowing the user to limit the trials listed in table 588. In the present example, only two trials are listed, but a user may generate many trials for each problem, and may work on many different problems concurrently or alternately. Filtering tools 590 may assist the user in finding trials of interest by allowing the user to filter listed trials by workflow, aircraft type, event category, event type, and/or event position. In some examples, filtering tools 590 may allow the user to filter by performance, for instance by specifying a minimum threshold criteria for accuracy, precision, recall, or warning time. The user may additionally or alternatively search the trials by key word.

Step 454 of method 400 includes receiving a selection of multiple trials. The user may select two or more trials to compare using comparative interface 586. In the depicted example, the user may hold the shift key and click on the trials to include in the selection. As noted in an interface key, the rows of selected trials in table 588 are displayed in a first color, shade, or pattern. A selected trial may be further highlighted or marked and accordingly displayed in a second or third color, shade, or pattern respectively. Highlighting and marking may be performed by interaction with visualizations of FIGS. 15 and 16 as described further below.

At step 456, the method includes displaying comparative visualizations of results of the selected trials. Visualization of head-to-head comparisons of the results of multiple trials may facilitate comparison of the performance of different algorithm types and/or alterations to algorithm parameters, to facilitate parameter turning and selection of an optimal algorithm configuration.

Figure 16:
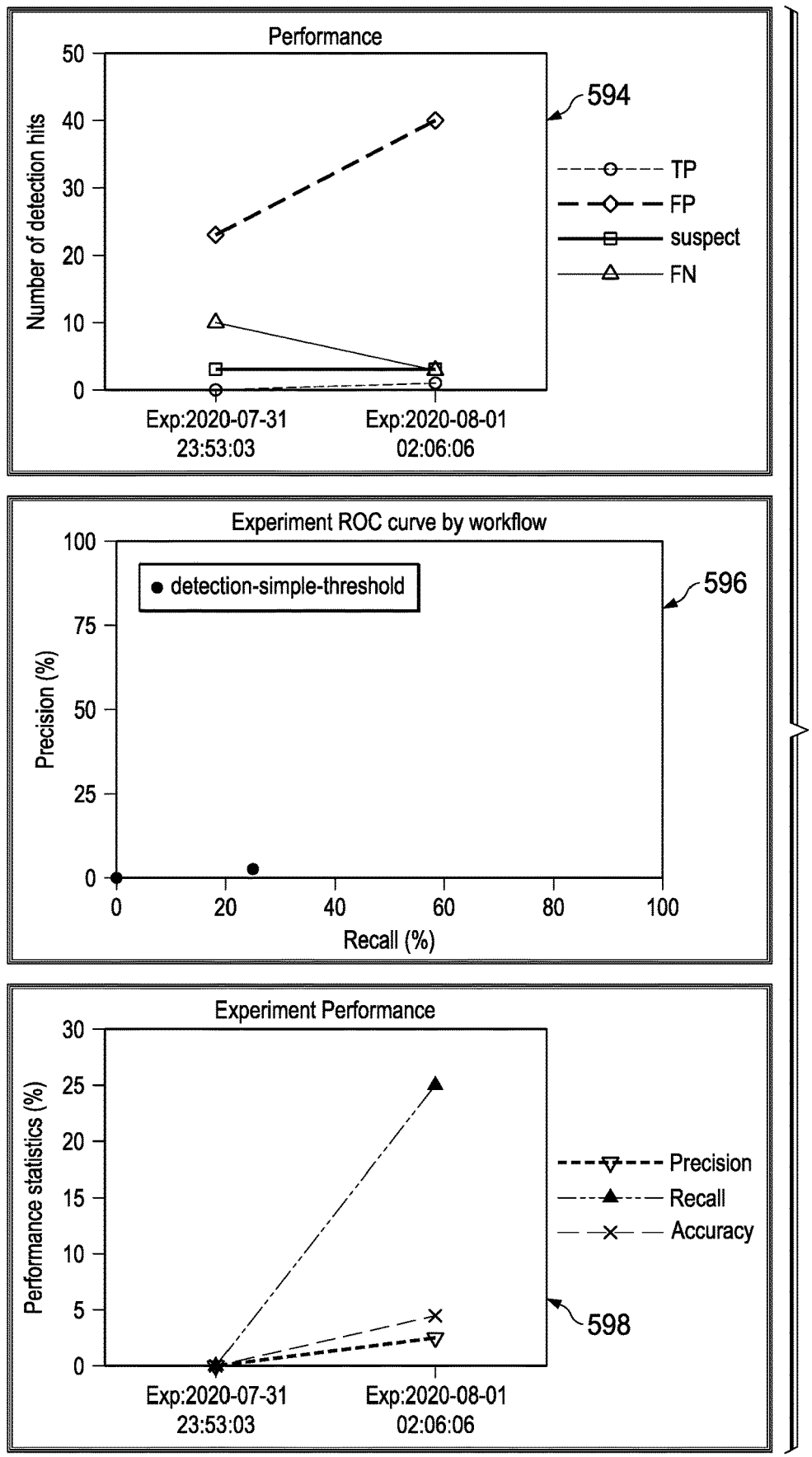
FIG. 16 is a diagram of illustrative comparative graphs of trial evaluation results, of the GUI of FIG. 5.

In general, any desired graphs, charts, plots, and/or tables comparing trial results may be displayed. In some examples, the training module may allow the user to select desired visualizations for display. In some examples, the displayed visualizations may depend on the validation techniques used in the selected trials. In the present example, a heat map 592, a performance chart 594, a receiver operator characteristic (ROC) curve graph 596, and a metric chart 598 are displayed, as shown in FIGS. 15 and 16. Each visualization includes every selected trial, which in the depicted example is two trials, but may include any desired number of trials.

Within each visualization, the user may highlight or mark a trial of interest for greater clarity. More specifically, the user may hover a cursor over a cell or point and the corresponding trial will be highlighted in table 588 if the comparative interface depicted in FIG. 14. The user may alternatively click a cell or point and the corresponding trial will be marked in table 588.

As shown in FIG. 15, heat map 592 displays detection types for each data segment. The selected trials are arranged along the vertical axis of heat map 592, and the data segments along the horizontal axis. Each cell 593 represents a detection type or confusion matrix designation for the respective trial in the respective segment. On cursor hover, a contextual label 595 is displayed for the cell, including the evaluation type and the respective trial and data segment. Each data segment is labelled with the corresponding aircraft tail number, event position, segment number.

The displayed evaluation may be based on the designations of any and all detections made by the algorithm in the respective data segment. Possible values include false positive (FP), true positive (TP), suspect positive (suspect), and false negative (FN). For each value, the cell is displayed as a corresponding color or pattern. The heat map visualization may allow the user to quickly compare performance of various trials for specific data segments.

As shown in FIG. 16, performance chart 594 plots the algorithm performance results for each selected trial. More specifically, the selected trials are arranged along the horizontal axis and number of occurrences along the vertical axis. A point is plotted for each trial, for each confusion matrix count: true positive, false positive, suspect positive, and false negative. Metric chart 598 similarly plots the three statistical metrics calculated from the confusion matrix outputs: precision, recall, and accuracy. The selected trials are again arranged along the horizontal axis and a percentage value along the vertical axis. A point is plotted for each trial, for each statistical metric. These two charts may allow the user to quickly visualize and compare overall algorithm performance between trials.

ROC curve graph 596 plots precision versus recall for each selected trial. Recall is graphed along the horizontal axis and precision along the vertical axis, each as a percentage. A point is plotted for each selected trial, to form a curve for each workflow represented in the selected trials. That is, each point is visually coded by color or shape according to the workflow of the corresponding trial. The user may thereby assess the important precision versus recall tradeoff between various configurations of an algorithm and also between algorithms.

The user may iterate steps 454 and 456 using comparative interface 586, as shown in FIG. 14. That is, the user may make repeated selections of multiple trials for comparison, and view the displayed comparative visualizations to gather desired insights. Additionally or alternatively, the user may return to step 414 to repeat method 400 to save additional trials, for further comparison. The user may repeat steps of the method in this manner in order to perform a grid search over a range of a particular parameter and/or to perform overall parameter tuning.

Step 458 of the method includes receiving a selection of one trial. Once the user has saved and identified a trial with satisfactory performance and/or other desired properties, the user may select the trial for implementation. In the present example, to proceed with implementation the user may use the Publish Algorithm button on the corresponding line of trial table 588.

Step 460 includes generating a predictive maintenance model from the algorithm configuration of the selected trial. The algorithm configuration of the selected trial may be trained on the full historical data set, to generate a final model. The model may then be prepared for implementation. For example, the trained model may be communicated to an implementation module such as module 220, described above. In some examples, the model may be codified for use by other software, or saved in an accessible format for other implementation by the user. Any useful modifications or additions may be made to prepare the model.

C. Illustrative Data Processing System

Figure 17:
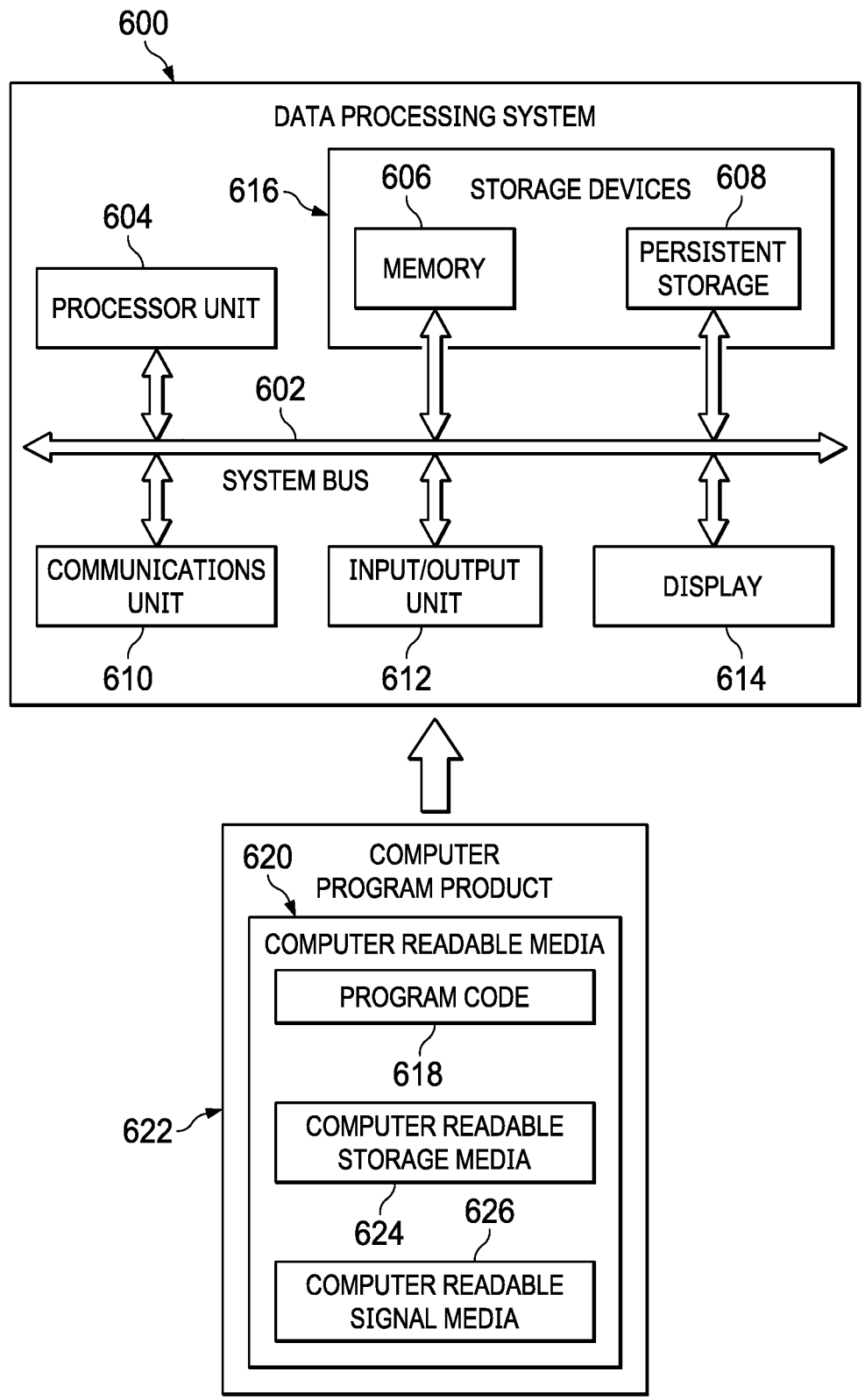
FIG. 17 is a schematic diagram of an illustrative data processing system suitable for use with aspects of the present disclosure.

As shown in FIG. 17, this example describes a data processing system 600 (also referred to as a computer, computing system, and/or computer system) in accordance with aspects of the present disclosure. In this example, data processing system 600 is an illustrative data processing system suitable for implementing aspects of the predictive maintenance model generation and custom feature creation methods described above. More specifically, in some examples, devices that are examples of data processing systems (e.g., servers, tablets, personal computers) may run one or more modules of a predictive maintenance model design system to execute the methods described above.

In this illustrative example, data processing system 600 includes a system bus 602 (also referred to as communications framework). System bus 602 may provide communications between a processor unit 604 (also referred to as a processor or processors), a memory 606, a persistent storage 608, a communications unit 610, an input/output (I/O) unit 612, and/or a display 614.

Processor unit 604 serves to run instructions that may be loaded into memory 606. Processor unit 604 may comprise a number of processors, a multi-processor core, and/or a particular type of processor or processors (e.g., a central processing unit (CPU), graphics processing unit (GPU), etc.), depending on the particular implementation. Further, processor unit 604 may be implemented using a number of heterogeneous processor systems in which a main processor is present with secondary processors on a single chip.

Memory 606 and persistent storage 608 are examples of storage devices 616. A storage device may include any suitable hardware capable of storing information (e.g., digital information), such as data, program code in functional form, and/or other suitable information, either on a temporary basis or a permanent basis. Storage devices 616 also may be referred to as digital storage devices, computer-readable storage devices, or computer-readable media.

Persistent storage 608 may contain one or more components or devices. For example, persistent storage 608 may include one or more devices such as a magnetic disk drive (also referred to as a hard disk drive or HDD), solid state disk (SSD), an optical disk drive such as a compact disk ROM device (CD-ROM), flash memory card, memory stick, and/or the like, or any combination of these. One or more of these devices may be removable and/or portable, e.g., a removable hard drive.

Input/output (I/O) unit 612 allows for input and output of data with other devices that may be connected to data processing system 600 (i.e., input devices and output devices). For example, an input device may include one or more pointing and/or information-input devices such as a keyboard, a mouse, touch screen, microphone, digital camera, and/or the like. These and other input devices may connect to processor unit 604 through system bus 602 via interface port(s) such as a serial port and/or a universal serial bus (USB).

Output devices may use some of the same types of ports, and in some cases the same actual ports, as the input device(s). For example, a USB port may be used to provide input to data processing system 600 and to output information from data processing system 600 to an output device. Some output devices (e.g., monitors, speakers, and printers, among others) may require special adapters. Display 614 may include any suitable human-machine interface or other mechanism configured to display information to a user, e.g., a CRT, LED, or LCD monitor or screen, etc.

Communications unit 610 refers to any suitable hardware and/or software employed to provide for communications with other data processing systems or devices. While communication unit 610 is shown inside data processing system 600, it may in some examples be at least partially external to data processing system 600. Communications unit 610 may include internal and external technologies, e.g., modems, ISDN adapters, and/or wired and wireless Ethernet cards, hubs, routers, etc. Data processing system 600 may operate in a networked environment, using logical connections to one or more remote computers.

Instructions for the operating system, applications, and/or programs may be located in storage devices 616, which are in communication with processor unit 604 through system bus 602. In these illustrative examples, the instructions are in a functional form in persistent storage 608. These instructions may be loaded into memory 606 for execution by processor unit 604. Processes of one or more examples of the present disclosure may be performed by processor unit 604 using computer-implemented instructions, which may be located in a memory, such as memory 606.

These instructions are referred to as program instructions, program code, computer usable program code, or computer-readable program code executed by a processor in processor unit 604. The program code in the different examples may be embodied on different physical or computer-readable storage media, such as memory 606 or persistent storage 608. Program code 618 may be located in a functional form on computer-readable media 620 that is selectively removable and may be loaded onto or transferred to data processing system 600 for execution by processor unit 604. Program code 618 and computer-readable media 620 form computer program product 622 in these examples. In one example, computer-readable media 620 may comprise computer-readable storage media 624 or computer-readable signal media 626.

Computer-readable storage media 624 may include, for example, an optical or magnetic disk that is inserted or placed into a drive or other device that is part of persistent storage 608 for transfer onto a storage device, such as a hard drive, that is part of persistent storage 608. Computer-readable storage media 624 also may take the form of a persistent storage, such as a hard drive, a thumb drive, or a flash memory, that is connected to data processing system 600. In some instances, computer-readable storage media 624 may not be removable from data processing system 600.

In these examples, computer-readable storage media 624 is a non-transitory, physical or tangible storage device used to store program code 618 rather than a medium that propagates or transmits program code 618. Computer-readable storage media 624 is also referred to as a computer-readable tangible storage device or a computer-readable physical storage device. In other words, computer-readable storage media 624 is media that can be touched by a person.

Alternatively, program code 618 may be transferred to data processing system 600, e.g., remotely over a network, using computer-readable signal media 626. Computer-readable signal media 626 may be, for example, a propagated data signal containing program code 618. For example, computer-readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative examples, program code 618 may be downloaded over a network to persistent storage 608 from another device or data processing system through computer-readable signal media 626 for use within data processing system 600. For instance, program code stored in a non-transitory computer-readable storage medium in a server data processing system may be downloaded over a network from the server to data processing system 600. The computer providing program code 618 may be a server computer, a client computer, or some other device capable of storing and transmitting program code 618.

The different components illustrated for data processing system 600 are not meant to provide architectural limitations to the manner in which different examples may be implemented. One or more examples of the present disclosure may be implemented in a data processing system that includes fewer components or includes components in addition to and/or in place of those illustrated for data processing system 600. Other components shown in FIG. 17 can be varied from the examples depicted. Different examples may be implemented using any hardware device or system capable of running program code.

Illustrative Combinations and Additional Examples

This section describes additional aspects and features of predictive maintenance model design systems, computer implemented methods of predictive maintenance design, and computer programs product for generating predictive maintenance models, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A data processing system for generating predictive maintenance models, comprising:
one or more processors;
a memory including one or more digital storage devices; and
a plurality of instructions stored in the memory and executable by the one or more processors to:
receive a historical dataset relating to each system of a plurality of systems, the historical dataset including maintenance data and operational data,
display one or more algorithm templates and one or more data features calculated from the operational data in a graphical user interface,
receive a selection of an algorithm template, a data feature, and a first value of a parameter associated with the algorithm template,
train and evaluate the selected algorithm template on the selected data feature according to the first value of the parameter,
display a first result of a metric of the evaluation in the graphical user interface, and
generate a predictive maintenance model, using the selected algorithm template.

A1. The data processing system of A0, wherein the plurality of instructions are further executable by the one or more processors to, prior to generating the predictive maintenance model,
receive a second value of the parameter,
train and evaluate the selected algorithm template on the selected data feature according to the second parameter value,
display a second result of the metric of the evaluation in the graphical user interface, and
display a comparison of the first and second results in the graphical user interface.

A2. The data processing system of A0 or A1, wherein the plurality of instructions are further executable by the one or more processors to, prior to generating the predictive maintenance model,
receive a selection of a second algorithm template,
train and evaluate the second algorithm template on the selected data feature according to the first parameter value,
display a second result of the metric of the evaluation in the graphical user interface, and
display a comparison of first and second results in the graphical user interface.

A3. The data processing system of any of A0-A2, wherein the plurality of instructions are further executable by the one or more processors to, prior to generating the predictive maintenance model,
receive a selection of a plurality of combinations of an algorithm template and a parameter value,
train and evaluate each combination of algorithm template and parameter value,
display a comparison of results of the metric of the evaluations in the graphical user interface,
receive a selection of one of the plurality of combinations.

A4. The data processing system of A3, wherein the plurality of instructions are further executable by the one or more processors to, in response to a user interaction with the graphical user interface,
display the result of the metric of the evaluation of the selected combination,
display the result of one or more additional metrics of the evaluation of the selected combination.

A5. The data processing system of A3 or A4, wherein the display of the comparison of the results of the metric of the evaluations includes a chart, plot, or heat map.

A6. The data processing system of any of A0-A5, wherein the plurality of instructions are further executable by the one or more processors to, prior to training and evaluating the selected algorithm template,
display a graphical preview of the first value of the parameter with a subset of the selected data feature.

A7. The data processing system of A6, wherein the plurality of instructions are further executable by the one or more processors to,
receive a selection of maintenance events from the maintenance data of the historical dataset,
divide the selected data feature into segments according to the selected maintenance events, and
receive a selection of a segment,
wherein the subset of the selected data feature displayed in the graphical preview is the selected segment.

A8. The data processing system of any of A0-A7, wherein the operational data are time-labeled, and the plurality of instructions are further executable by the one or more processors to:
receive a selection of maintenance events from the maintenance data.
divide the time-labeled operational data of the selected data feature into multiple time periods according to a selected time relationship to the selected maintenance events, and
assign a qualitative label to each of the time periods.
wherein the selected algorithm template is trained and evaluated using the assigned qualitative labels.

A9. The data processing system of any of A0-A8, wherein:
the displayed algorithm templates are anomaly detection algorithms, the plurality of instructions are further executable by the one or more processors to receive a selection of maintenance events from the maintenance data of the historical dataset, and training and evaluating the selected algorithm template includes detecting anomalies in a test subset of the operational data and designating the detected anomalies as true positive, false positive, or undetermined based on a time relationship to the selected maintenance events.

A10. The data processing system of any of A0-A9, wherein the plurality of instructions are further executable by the one or more processors to, subsequent to receiving a selection of an algorithm template, display a plurality of parameters associated with the selected algorithm template.

A11. The data processing system of A10, wherein displaying the plurality of parameters includes displaying a suggested value for one or more of the displayed parameters.

A12. The data processing system of any of A0-A11, wherein the selected algorithm template includes a simple threshold anomaly detection algorithm.

A13. The data processing system of A12, wherein the parameter is one of (a) an operational data feature value threshold, (b) a persistence threshold, or (c) a statistical significance threshold.

A14. The data processing system of any of A0-A13, wherein the plurality of instructions are further executable by the one or more processors to receive a value of a parameter regulating data pre-processing, and training and evaluating the selected algorithm template includes pre-processing the selected data feature according to the received value of the parameter.

A15. The data processing system of A14, wherein the parameter is a quantity controlling one of (a) smoothing, (b) filtering, (c) normalization, or (d) a logical operation.

A16. The data processing system of any of A0-A15, wherein the metric is one of (a) accuracy, (b) precision, (c) recall, or (d) F score.

A17. The data processing system of any of A0-A16, wherein the plurality of instructions are further executable by the one or more processors to, in response to a user interaction with the graphical user interface, generate the first value of the parameter by use of a machine learning method.

A18. The data processing system of any of A0-A17, wherein the one or more displayed algorithm templates include a semi-supervised standard reference anomaly detection algorithm template.

A19. The data processing system of any of A0-A18, wherein training and evaluating the selected algorithm template includes dividing the historical dataset into a training dataset and a testing dataset.

A20. The data processing system of A19, wherein the division of the historical dataset is received from a user.

A21. The data processing system of any of A0-A20, wherein the plurality of systems are a fleet of aircraft.

A22. The data processing system of any of A0-A21, where the metric includes a confusion matrix output.

A23. The data processing system of any of A0-A22, wherein the metric is calculated from a confusion matrix output.

A24. The data processing system of any of A0-A23, wherein the metric includes a statistical measure of warning time performance, where warning time is a time between a detected anomaly and a subsequent maintenance event related to a corresponding component.

A25. The data processing system of any of A0-A24, wherein the parameter is a quantity controlling a level of data pooled for normalization.

A26. The data processing system of any of A0-A25, wherein receiving a selection of a data feature includes receiving a selection of multiple data features, and the selected algorithm template is trained and evaluated on the selected multiple data features.

A27. The data processing system of any of A0-A26, wherein the plurality of instructions are further executable by the one or more processors to receive a selection of maintenance events from the maintenance data.

A28. The data processing system of A27, wherein the operational data are time-labeled, and the plurality of instructions are further executable by the one or more processors to:

divide the time-labeled operational data of the selected data feature into multiple time periods according to a selected time relationship to the selected maintenance events, and assign a qualitative label to each of the time periods.

A29. The data processing system of A28, wherein the time-labeled operational data are divided into at least three time periods, including a first period of time more than a first threshold time prior to a maintenance event, and a second period of time less than a second threshold time prior to a maintenance event.

A30. The data processing system of A29, wherein the first and second threshold times are selectable by a user.

A31. The data processing system of any of A28-A30, wherein the qualitative labels include 'healthy' and 'degraded'.

A32. The data processing system of any of A28-A31, wherein the selected algorithm template is trained and evaluated using the assigned qualitative labels.

A33. The data processing system of any of A0-A32, wherein displaying one or more algorithm templates includes displaying a plurality of manipulable blocks, the blocks representing steps of a machine learning method and being inter-connectable by the user to designate a desired machine learning method.

A34. The data processing system of A33, wherein the plurality of manipulable blocks include at least one of each of (a) data pre-processing steps, (b) anomaly detection algorithms, and (c) algorithm evaluation.

A35. The data processing system of A33 or A34, wherein each block is further configurable by the user.

B0. A computer implemented method of generating a predictive maintenance model, comprising:

receiving a historical dataset relating to each system of a plurality of systems, the historical dataset including maintenance data and operational data, displaying one or more algorithm templates and one or more data features calculated from the operational data, receiving a selection of an algorithm template, a data feature, and a first value of a parameter associated with the algorithm template, training and evaluating the selected algorithm template on the selected data feature according to the first value of the parameter, displaying a first result of a metric of the evaluation in the graphical user interface, and generating a predictive maintenance model, using the selected algorithm template.

C0. A computer program product for generating predictive maintenance models, the computer program product comprising:

a non-transitory computer-readable storage medium having computer-readable program code embodied in the storage medium, the computer-readable program code configured to cause a data processing system to generate a predictive maintenance model, the computer-readable program code comprising:
  at least one instruction to receive a historical dataset relating to each system of a plurality of systems, the historical dataset including maintenance data and operational data,
  at least one instruction to display one or more algorithm templates and one or more data features calculated from the operational data in a graphical user interface,
  at least one instruction to receive a selection of an algorithm template, a data feature, and a first value of a parameter associated with the algorithm template,
  at least one instruction to train and evaluate the selected algorithm template on the selected data feature according to the first value of the parameter,
  at least one instruction to display a first result of a metric of the evaluation in the graphical user interface, and
  at least one instruction to generate a predictive maintenance model, using the selected algorithm template.

D0. A data processing system for generating machine learning models, comprising:
  one or more processors;
  a memory including one or more digital storage devices; and
  a plurality of instructions stored in the memory and executable by the one or more processors to:
  receive a historical dataset,
  display a plurality of algorithm templates, a listing of data features calculated from the historical dataset, and a parameter in a graphical user interface,
  receive a selection of an algorithm template, one or more of the listed data features from a user, and a first value of the parameter,
  train and evaluate the algorithm template on the selected data features according to the first parameter value,
  display a first result of a metric of the evaluation in the graphical user interface, and
  generate a machine learning model, using the selected algorithm template, data features, and parameter value.

Advantages, Features, and Benefits

The different examples of the predictive maintenance model design system described herein provide several advantages over known solutions for using machine learning models to forecast maintenance. For example, illustrative examples described herein allow creation of models for effective maintenance forecasting without programming or data science expertise.

Additionally, and among other benefits, illustrative examples described herein facilitate comparative evaluation of candidate algorithm types.

Additionally, and among other benefits, illustrative examples described herein allow training and testing of algorithm configurations without need for coding skill or familiarity with machine learning programming tools.

Additionally, and among other benefits, illustrative examples described herein provide quantitative metrics and visual feedback for optimization of parameters.

Additionally, and among other benefits, illustrative examples described herein provide guided selection of appropriate algorithms and associated parameter values.

Additionally, and among other benefits, illustrative examples described herein allow multiple levels of user involvement in algorithm selection, data pre-processing, training, and evaluation, according to user expertise and/or for refinement from simpler to more complex models.

No known system or device can perform these functions, particularly with a complex dataset based on recorded telemetry from equipment cycling through multiple operational phases. Thus, the illustrative examples described herein are particularly useful for aircraft maintenance forecasting. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A data processing system for generating predictive maintenance models, comprising:
  one or more processors;
  a memory including one or more digital storage devices; and
  a plurality of instructions stored in the memory and executable by the one or more processors to:
  receive a historical dataset relating to each system of a plurality of systems, the historical dataset including maintenance data and operational data,
  display one or more algorithm templates and one or more data features calculated from the operational data in a graphical user interface (GUI),
  receive from a user a selection of an algorithm template, a data feature, and a first value of a parameter associated with the algorithm template, via the GUI,
  subsequently train and evaluate the selected algorithm template on the selected data feature according to the first value of the parameter,
  display a first result of a metric of the evaluation in the GUI, and
  generate a predictive maintenance model, using the selected algorithm template.

2. The data processing system of claim 1, wherein the plurality of instructions are further executable by the one or more processors to, prior to generating the predictive maintenance model:
  receive a second value of the parameter from the user,
  train and evaluate the selected algorithm template on the selected data feature according to the second value of the parameter, display a second result of the metric of the evaluation in the GUI, and
display a comparison of the first result and the second result in the GUI.

3. The data processing system of claim 1, wherein the plurality of instructions are further executable by the one or more processors to, prior to generating the predictive maintenance model:
receive from the user a selection of a plurality of combinations of an algorithm template and a parameter value,
train and evaluate each combination of algorithm template and parameter value,
display a comparison of results of the metric of the evaluations in the GUI, and
receive from the user a selection of one of the plurality of combinations.

4. The data processing system of claim 1, wherein the operational data are time-labeled, and the plurality of instructions are further executable by the one or more processors to:
receive from the user a selection of maintenance events from the maintenance data;
divide the time-labeled operational data of the selected data feature into multiple time periods according to a selected time relationship to the selected maintenance events; and
assign a qualitative label to each of the time periods,
wherein the selected algorithm template is trained and evaluated using the assigned qualitative labels.

5. The data processing system of claim 1, wherein:
the one or more displayed algorithm templates are associated with anomaly detection algorithms,
the plurality of instructions are further executable by the one or more processors to receive, from the user, a selection of maintenance events from the maintenance data of the historical dataset, and
training and evaluating the selected algorithm template includes detecting anomalies in a test subset of the operational data and designating the detected anomalies as true positive, false positive, or undetermined based on a time relationship to the selected maintenance events.

6. The data processing system of claim 1, wherein the plurality of instructions are further executable by the one or more processors to, subsequent to receiving a selection of an algorithm template and prior to receiving a first value of a parameter associated with the algorithm template:
display a plurality of parameters associated with the selected algorithm template in the GUI.

7. The data processing system of claim 1, wherein the selected algorithm template includes a simple threshold anomaly detection algorithm.

8. The data processing system of claim 7, wherein the parameter is one of (a) an operational data feature value threshold, (b) a persistence threshold, or (c) a statistical significance threshold.

9. The data processing system of claim 1, wherein the plurality of instructions are further executable by the one or more processors to receive from the user a value of a parameter regulating data pre-processing, and wherein training and evaluating the selected algorithm template includes pre-processing the selected data feature according to the received value of the parameter.

10. The data processing system of claim 9, wherein the parameter is a quantity controlling one of (a) smoothing, (b) filtering, (c) normalization, or (d) a logical operation.

11. The data processing system of claim 1, wherein the metric is one of (a) accuracy, (b) precision, (c) recall, or (d) F score.

12. The data processing system of claim 1, wherein training and evaluating the selected algorithm template includes dividing the historical dataset into a training dataset and a testing dataset.

13. The data processing system of claim 1, wherein the plurality of systems are a fleet of aircraft.

14. The data processing system of claim 1, wherein the metric is calculated from a confusion matrix output.

15. The data processing system of claim 1, wherein the metric includes a statistical measure of warning time performance, where warning time is a time between a detected anomaly and a subsequent maintenance event related to a corresponding component.

16. The data processing system of claim 1, wherein the GUI includes an algorithm template selection menu and a feature selection menu, and the plurality of instructions are executable to display the one or more algorithm templates in the algorithm template selection menu and the one or more data features calculated from the operational data in the feature selection menu.

17. The data processing system of claim 1, wherein the maintenance data includes a plurality of maintenance events, and the plurality of instructions are further executable by the one or more processors to:
display an event selection box in the GUI,
receive from the user a selection of at least one condition restricting the plurality of maintenance events to a subset of the plurality of maintenance events, via the event selection box in the GUI, and
use the subset of the plurality of maintenance events in training and evaluating the selected algorithm template.

18. The data processing system of claim 1, wherein the GUI includes an interactive workflow building environment and the plurality of instructions are executable to display the one or more algorithm templates and the one or more data features calculated from the operational data as manipulable blocks in the interactive workflow building environment.

19. A computer implemented method of generating a predictive maintenance model, comprising:
receiving a historical dataset relating to each system of a plurality of systems, the historical dataset including maintenance data and operational data,
displaying one or more algorithm templates and one or more data features calculated from the operational data in a graphical user interface (GUI),
receiving from a user a selection of an algorithm template, a data feature, and a first value of a parameter associated with the algorithm template, via the GUI,
subsequently training and evaluating the selected algorithm template on the selected data feature according to the first value of the parameter,
displaying a first result of a metric of the evaluation in the GUI, and
generating the predictive maintenance model, using the selected algorithm template.

20. A computer program product for generating predictive maintenance models, the computer program product comprising:
a non-transitory computer-readable storage medium having computer-readable program code embodied in the storage medium, the computer-readable program code configured to cause a data processing system to generate a predictive maintenance model, the computer-readable program code comprising:

at least one instruction to receive a historical dataset relating to each system of a plurality of systems, the historical dataset including maintenance data and operational data, at least one instruction to display one or more algorithm templates and one or more data features calculated from the operational data in a graphical user interface (GUI), at least one instruction to receive from a user a selection of an algorithm template, a data feature, and a first value of a parameter associated with the algorithm template, via the GUI, at least one instruction to subsequently train and evaluate the selected algorithm template on the selected data feature according to the first value of the parameter, at least one instruction to display a first result of a metric of the evaluation in the GUI, and at least one instruction to generate the predictive maintenance model, using the selected algorithm template.

\* \* \* \* \*